(12) United States Patent
Tokiwa

(10) Patent No.: US 10,375,142 B2
(45) Date of Patent: Aug. 6, 2019

(54) APPARATUS, SYSTEM, AND METHOD OF PROVIDING SCREEN DATA

(71) Applicant: Masafumi Tokiwa, Kanagawa (JP)

(72) Inventor: Masafumi Tokiwa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 668 days.

(21) Appl. No.: 15/063,078

(22) Filed: Mar. 7, 2016

(65) Prior Publication Data
US 2016/0274854 A1 Sep. 22, 2016

(30) Foreign Application Priority Data

Mar. 20, 2015 (JP) .................................. 2015-058813
Feb. 9, 2016 (JP) .................................. 2016-023188

(51) Int. Cl.
*H04L 29/08* (2006.01)
*G06F 3/14* (2006.01)

(52) U.S. Cl.
CPC ............ *H04L 67/02* (2013.01); *G06F 3/1415* (2013.01); *H04L 67/141* (2013.01);
(Continued)

(58) Field of Classification Search
USPC ................................. 709/201, 217, 219, 220
See application file for complete search history.

(56) References Cited

U.S. PATENT DOCUMENTS

2007/0133843 A1* 6/2007 Nakatani ............ G06Q 20/3276
382/115
2010/0332677 A1* 12/2010 Tian ........................ H04L 67/16
709/233

(Continued)

FOREIGN PATENT DOCUMENTS

CN 102047264 A 5/2011
CN 102196136 A 5/2011
(Continued)

OTHER PUBLICATIONS

Chinese Office Action dated Apr. 4, 2018 issued in corresponding Chinese Application No. 201610157084.9.

*Primary Examiner* — Chirag R Patel
*Assistant Examiner* — Marshall M McLeod
(74) *Attorney, Agent, or Firm* — Harness, Dickey & Pierce, P.L.C.

(57) ABSTRACT

Example embodiments of the present invention include a server for providing screen data to be shared among a plurality of information processing apparatuses. The server receives a first request for obtaining operation screen data from a first information processing apparatus, stores in a memory a communication identifier for identifying a communication between the server and the first information processing apparatus, and transmits to the first information processing apparatus first operation screen data for the first information processing apparatus that includes the communication identifier. In response to receiving a second request for obtaining operation screen data from a second information processing apparatus being a mobile terminal, the server transmits to the second information processing apparatus second operation screen data for the second information processing apparatus that is associated with the first operation screen data for display, based on a determination indicating that a communication identifier of the received second request matches the communication identifier being displayed.

20 Claims, 24 Drawing Sheets

(52) U.S. Cl.
CPC ....... *H04L 67/146* (2013.01); *G09G 2354/00* (2013.01); *G09G 2370/022* (2013.01); *G09G 2370/027* (2013.01); *G09G 2370/04* (2013.01)

(56) References Cited

U.S. PATENT DOCUMENTS

| | | | |
|---|---|---|---|
| 2011/0072493 A1 | 3/2011 | Morishita et al. | |
| 2011/0228326 A1* | 9/2011 | Hoshino | H04N 1/00222 358/1.15 |
| 2012/0268768 A1* | 10/2012 | Nakashima | G06F 21/608 358/1.13 |

FOREIGN PATENT DOCUMENTS

| | | |
|---|---|---|
| JP | 2007-115039 | 5/2007 |
| JP | 2008-270972 A | 11/2008 |
| JP | 2010-114686 A | 5/2010 |
| JP | 2012-230514 | 11/2012 |

* cited by examiner

FIG. 11

| SESSION ID | FIRST DEVICE ID (IMAGE PROCESSING APPARATUS) | SECOND DEVICE ID (MOBILE TERMINAL) | URL |
|---|---|---|---|
| session001 | MFP0001 | SMART0001 | /url1001 |
| session002 | MFP0002 | SMART0002 | /url1002 |
| ... | ... | ... | ... |

FIG. 12

| SESSION ID | INPUT INFORMATION | | | |
|---|---|---|---|---|
| | item (0) | item (1) | item (2) | ... |
| session001 | name001 | address001 | tel001 | ... |
| session002 | ... | ... | ... | ... |
| ... | ... | ... | ... | ... |

APPARATUS, SYSTEM, AND METHOD OF PROVIDING SCREEN DATA

CROSS-REFERENCE TO RELATED APPLICATIONS

This patent application is based on and claims priority pursuant to 35 U.S.C. § 119(a) to Japanese Patent Application Nos. 2015-058813, filed on Mar. 20, 2015, and 2016-023188, filed on Feb. 9, 2016, in the Japan Patent Office, the entire disclosure of which is hereby incorporated by reference herein.

BACKGROUND

Technical Field

The present invention generally relates to an apparatus, system, and method of providing screen data.

Description of the Related Art

Screens may be shared among a plurality of information processing apparatuses, for example, between a digital multifunctional peripheral (MFP) and a mobile terminal.

For example, an external server may be provided, which provides a web-based screen to each one of the information processing apparatuses. The information processing apparatus, installed with a web browser, can then display the web-based screen. While the user is able to see the screen from any apparatus, the user could not input through the displayed screen in a manner to reflect such input on screen data, as the screen data is actually managed at the external server.

SUMMARY

Example embodiments of the present invention include a server coupled to a plurality of information processing apparatuses through a network, for providing screen data to be shared among the plurality of information processing apparatuses. The server receives a first request for obtaining operation screen data from a first information processing apparatus through the network, stores in a memory a communication identifier for identifying a communication between the server and the first information processing apparatus, and transmits first operation screen data including the communication identifier to the first information processing apparatus through the network. In response to receiving a second request for obtaining operation screen data from a second information processing apparatus being a mobile terminal accessing the server, the server determines whether a communication identifier of the received second request matches the communication identifier stored in the memory, and transmits, to the second information processing apparatus through the network, second operation screen data for the second information processing apparatus that is associated with the first operation screen data for the first information processing apparatus, based on a determination indicating that the communication identifier of the received second request matches the communication identifier stored in the memory. The second operation screen data is displayed at the second information processing apparatus.

Example embodiments of the present invention include a method performed by the server, and a non-transitory recording medium storing a control program to be operated by the server.

Example embodiments of the present invention include a system including the server, and at least the first information processing apparatus. The system may further include the second information processing apparatus being the mobile terminal.

BRIEF DESCRIPTION I/F THE SEVERAL VIEWS I/F THE DRAWINGS

A more complete appreciation of the disclosure and many of the attendant advantages and features thereof can be readily obtained and understood from the following detailed description with reference to the accompanying drawings, wherein:

FIG. 11 is an illustration of an example data structure of a session management table;

FIG. 12 is an illustration of an example data structure of an input information table;

Figure 1:
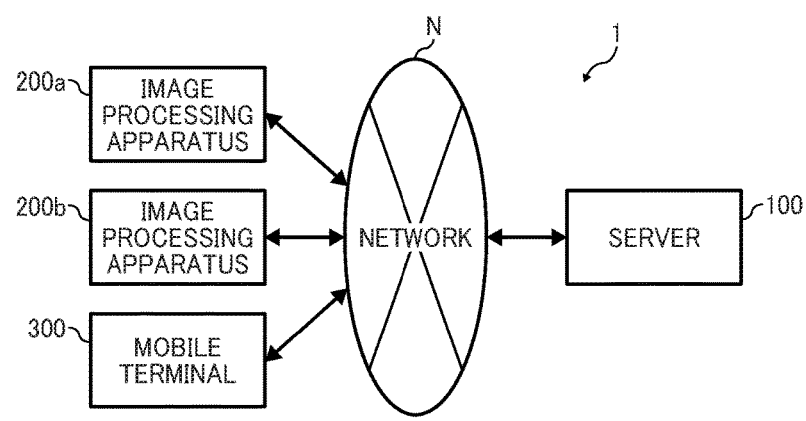
FIG. 1 is a schematic block diagram illustrating an information processing system including a server, according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring to FIGS. 1 to 15, an information processing system 1 is explained according to an embodiment of the present invention.

FIG. 1 is a schematic block diagram illustrating a configuration of the information processing system 1 according to the embodiment. As illustrated in FIG. 1, the information processing system 1 includes a server 100 and a plurality of image processing apparatuses 200a and 200b, which are connected through a network N. The mobile terminal 300 may be connected to the network N through a wireless network.

In this embodiment, the server 100 allows a user at the mobile terminal 300 to input various information to the image processing apparatus 200a or 200b, using the mobile terminal 300. Since the server 100 processes each of the accesses from the image processing apparatuses 200a and 200b, independently, any arbitrary one of the image processing apparatuses 200a and 200b may be simply referred to as the image processing apparatus 200 in this disclosure. The image processing apparatus 200 may be a scanner, printer, copier, facsimile, storage server, or a multifunctional peripheral (MFP) having various information processing functions or image processing functions.

The mobile terminal 300 is any information processing device that can be freely carried by a user, such as a smart phone or a tablet PC. As long as the mobile terminal 300 is provided with a communication device capable of accessing the server 100, such as a network interface and a web browser, the user may use any desired device as the mobile terminal 300 to communicate with the server 100. For example, a different device may be used as the mobile terminal 300 for the same user at different times.

The network N, which may be of wired or wireless, enables communication between the server 100 and an external apparatus such as the image processing apparatus 200 and the mobile terminal 300 in compliance with any desired communication protocol. The image processing apparatus 200 and the mobile terminal 300 may not be communicable with each other through the network N. For example, when a firewall is provided on the network N to block unauthorized access to the image processing apparatus 200, the mobile terminal 300 may not be able to directly access the image processing apparatus 200.

Figure 2A:
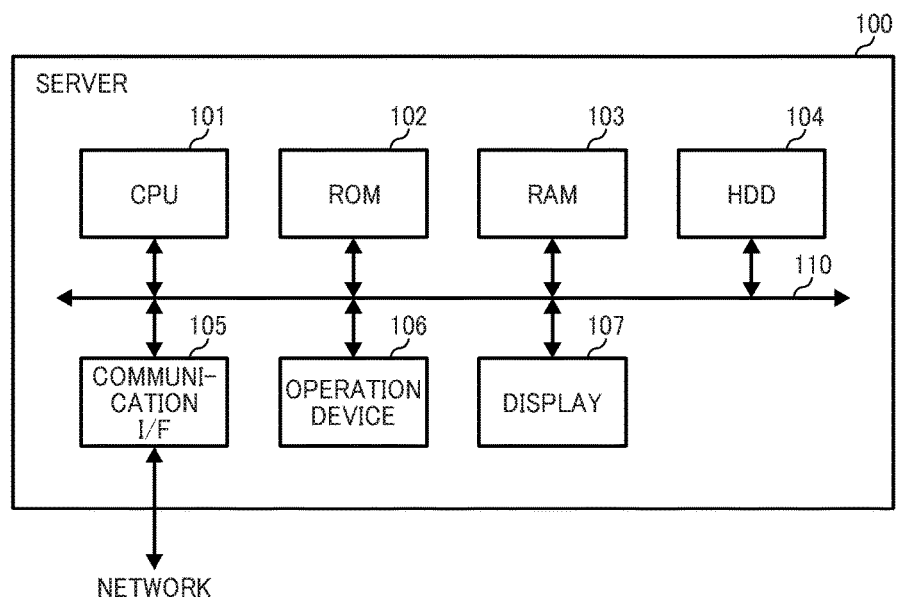
FIGS. 2A to 2C (FIG. 2) are schematic block diagrams illustrating a hardware configuration of the information processing system of FIG. 1, according to an embodiment of the present invention.

FIG. 2A is a schematic block diagram illustrating a hardware configuration of the server 100 according to an embodiment of the present invention. As illustrated in FIG. 2A, the server 100 includes a central processing unit (CPU) 101, a read only memory (ROM) 102, a random access memory (RAM) 103, a hard disk drive (HDD) 104, a communication interface (I/F) 105, an operation device 106, and a display 107, which are connected through a system bus 110.

The CPU 101 loads a program stored in the ROM 102 or the HDD 104 onto the RAM 103, as a work area, to control entire operation of the server 100 according to the executed program, as described below referring to FIG. 3.

The ROM 102 and the HDD 104, which may be implemented by a non-volatile memory, sores various programs or various data for execution by the CPU 101.

The communication I/F 105 is an interface that enables the server 100 to communicate with the external apparatus such as the image processing apparatus 200 or the mobile terminal 300, according to any desired communication protocol.

The operation device 106 receives a user input, and may be implemented by an input device such as a keyboard and a pointing device such as a mouse.

The display 107, which may be implemented by a liquid crystal display (LCD), displays information indicating an operating state or settings of the server 100 or a message o the user.

In this embodiment, any one of the operation device 106 and the display 107 may be provided separately from the server 100. Further, the server 100 does not have to receive the user input directly from the user, as the server 100 is able to receive the user input, or the user instruction, from an external device connected via the communication I/F 105. In such case, any one of the operation device 106 and the display 107 does not have to be incorporated in the server 100.

Figure 2B:
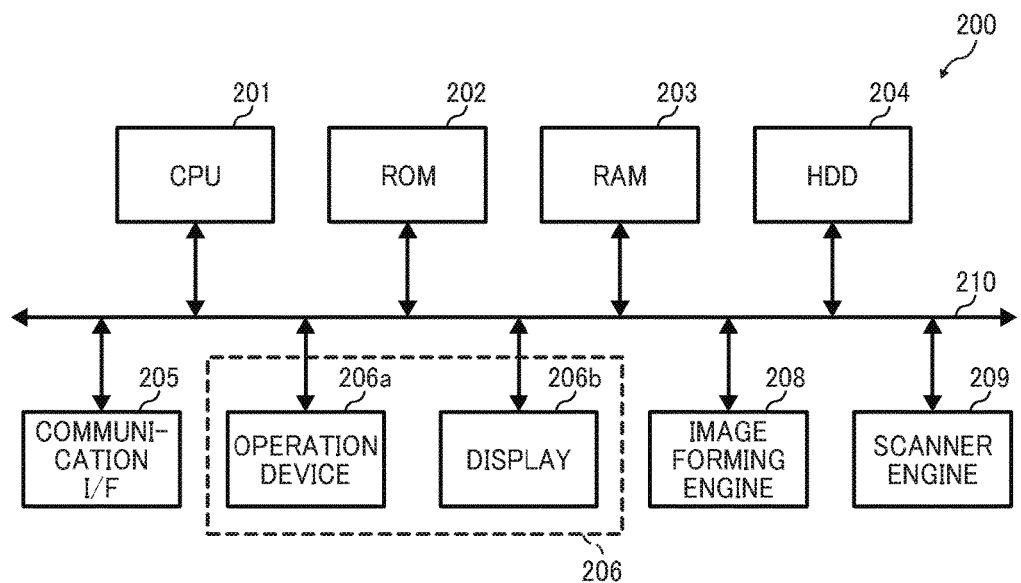

FIG. 2B is a schematic block diagram illustrating a hardware configuration of the image processing apparatus 200 according to an embodiment of the present invention. As illustrated in FIG. 2B, the image processing apparatus 200 includes a CPU 201, a ROM 202, a RAM 203, a HDD 204, a communication I/F 205, an operation device 206a, and a display 206b, which are connected through a bus 210. These elements are substantially similar in function and operation to the corresponding elements of the server 100 of FIG. 2A. The image processing apparatus 200 further includes an image forming engine 208 and a scanner engine 209.

The operation device 206a and the display 206b is provided as a control panel 206 of the image processing apparatus 200. For example, the operation device 206a corresponds to various hardware keys provided on the control panel 206, and software keys being displayed on a touch panel screen. The display 207a is a LCD with the touch panel.

The image forming engine 208 forms an image on a recording sheet under control of the CPU 201. The scanner engine 209 scans an image, such as an image on a recording sheet, under control of the CPU 201.

Figure 2C:
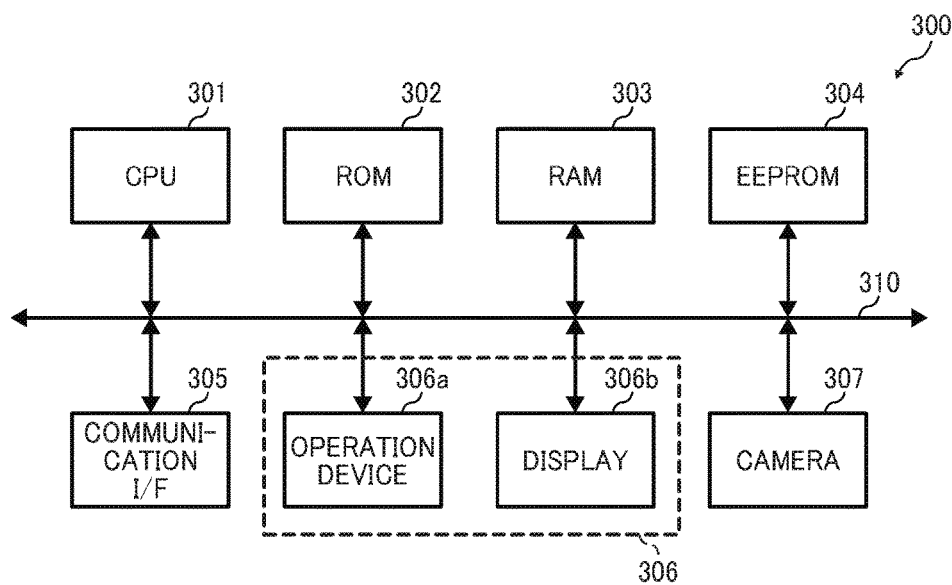

FIG. 2C is a schematic block diagram illustrating a hardware configuration of the mobile terminal 300 according to an embodiment of the present invention. As illustrated in FIG. 2C, the mobile terminal 300 includes a CPU 301, a ROM 203, a RAM 303, an EEPROM 304, a communication I/F 305, an operation device 306a, and a display 306b, which are connected through a bus 210. These elements are substantially similar in function and operation to the corresponding elements of the server 100 of FIG. 2A. The mobile terminal 300 further includes various devices such as a camera 307, a microphone, a speaker, a sensor, a GPS receiver, etc. The operation device 306a and the display 306b is provided as a touch panel 306 of the mobile terminal 300.

Figure 3:
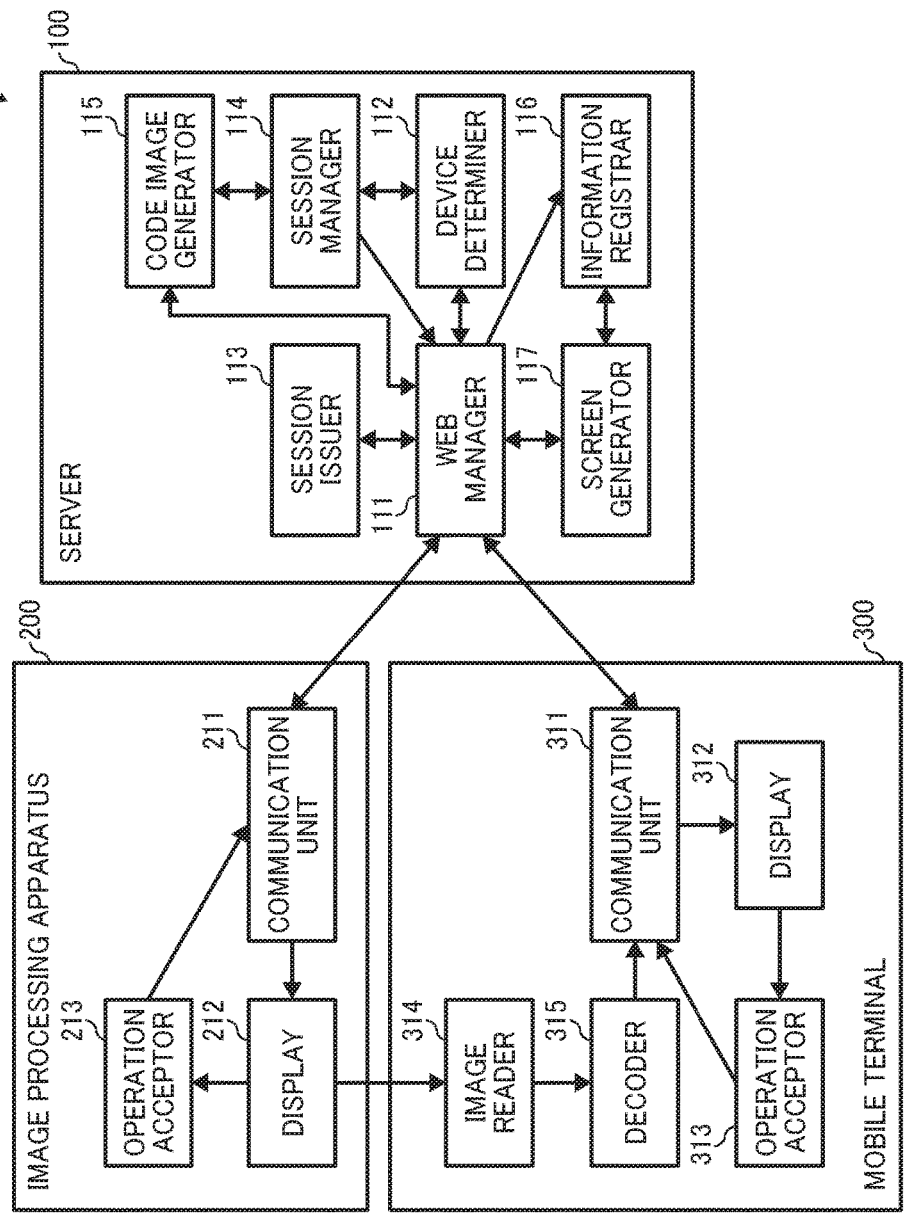
FIG. 3 is a schematic block diagram illustrating a functional configuration of the information processing system of FIG. 1, according to an embodiment of the present invention.

FIG. 3 illustrates a functional configuration of the information processing system 1 of FIG. 1. The functional configuration of FIG. 3 focuses on various functions to be provided by the server 100 in assisting the user at the mobile terminal 300 to input information to the image processing apparatus 200. The CPU 101 of the server 100 controls hardware according to a control program to achieve the functions described below referring to FIG. 3.

Referring to FIG. 3, the server 100 includes a web manager 111, a device determiner 112, a session issuer 113, a session manager 114, a code image generator 115, an information registrar 116, and a screen generator 117. These functional elements are achieved by the instructions of the CPU 101 generated according to the control program loaded onto the RAM 103.

The web manager 111, which causes the server 100 to function as a web content server, executes or causes the other units of the server 100 to execute processing according to a request received from the image processing apparatus 200 or the mobile terminal 300. In the following, the image processing apparatus 200 or the mobile terminal 300 that sends a request to the server 100 is referred to as a request sender device. The web manager 111, which corresponds to the web server application implemented by the instructions of the CPU 101 operates with the communication I/F 105 to transmit or receive requests in case of communicating with the external device.

The device determiner 112 obtains a session identifier and/or a device identifier in the request received from the request sender device via the web manager 111. The device determiner 112 may further obtain session information regarding the session being managed by the session manager 114. Based on the obtained information, the device determiner 112 determines a type or an operating state of the request sender device that sends the request to the server 100. For example, the device determiner 112 determines whether the request sender device is a device requesting for information input assistance service, that is, a device (such as the image processing apparatus 200) requiring assistance in inputting information to itself using a different device (such as the mobile terminal 300). The device determiner 112 may further determine whether the server 100 has established a session for the request sender device requesting the information input assistance service, or may further determine whether the server 100 has been registered as a destination to which input information is transmitted. The device determiner 112 sends a determination result indicating the type or the operating state of the request sender device to the web manager 111.

The session issuer 113 issues a new session to be established in response to a request from the request sender device via the web manager 111. More specifically, the session issuer 113 generates a session identifier ("session ID") to be assigned to a new session to be established with the request sender device. Using the session ID, the session issuer 113 is able to identify a series of accesses made by the request sender device for that request. The session issuer 113 sends the session ID to the session manager 114 to cause the session manager 114 to register that session ID.

The session manager 114 stores the session ID generated by the session issuer 113, in association with a device identifier identifying the request sender device that has established a session identified with that session ID, under control of the web manager 111.

More specifically, the session manager 114 manages session IDs using a session management table of FIG. 11, which is stored in a memory such as the RAM 103. The session management table of FIG. 11 includes a session ID, a first device ID, a second device ID, and a URL (uniform resource locator) in association with one another.

The session ID is generated by the session issuer 113 as described above. The first device ID is an identifier identifying the image processing apparatus 200 to communicate using the associated session ID. The second device ID is an identifier identifying the mobile terminal 300 to communicate using the associated session ID. As the device identifier, a machine model number may be used. The session management table of FIG. 11 indicates that the second device (mobile terminal 300) with the second device ID, is used to assist input of information to the first device (image processing apparatus 200).

The URL indicates a URL that is requested, when the request sender device requests the server 100 for the session ID. More specifically, the URL is address information to be used by the external apparatus in accessing the server 100 to send a specific request to the server 100. Each session ID is thus used to identify a request to a specific URL. For example, a URL is prepared for each screen to be used in receiving a user input.

Referring back to FIG. 3, in response to a request from the web manager 111, the code image generator 115 encodes the session ID, and the URL to be accessed using that session ID, into a code image. The code image may be, for example, a QR code or any other desired code.

The information registrar 116 registers the input information transmitted with the request from the external device, in association with the session ID that is used for transmitting such information, in response to a request from the web manager 111. The external device may be, for example, the mobile terminal 300.

For example, the information registrar 116 may register such information in an input information table of FIG. 12, which is stored in a memory such as the ROM 102. In the input information table of FIG. 12, the information registrar 116 stores an arbitrary number of items of input information Item (0) to Item (n) (n being an integer equal to or greater than 0), item by item, in association with the session ID. In this example, it is assumed that the "n+1th item" is referred to as the "Item(n)", and the "first item" is referred to as the "Item(0)".

As described above referring to FIG. 11, for each combination of a session ID and a URL for a specific request, the server 100 generates a specific screen for receiving input information. Accordingly, the contents or a number of items of input information may differ depending on a specific screen for input information. This results in the change in a number of items of input information to be registered, or a data format of input information to be registered, for each session ID, for the input information table of FIG. 12. For this reason, correspondence between each field having input information, and each field on the screen for input information, differs for each screen for receiving input information.

Referring back to FIG. 3, the screen generator 117 generates screen data to be transmitted to the external device that has accessed the server 100, in response to a request from the web manager 111. For example, this screen data is used to generate a screen for receiving input information from the user. In one example, the screen to be generated may be a screen including the code image generated by the code image generator 115, a screen having input information registered at the information registrar 116, or a screen having information not entered. The screen data may be generated, for example, as HTML-based web content data.

As described above, a URL is provided for each screen to be generated to process a specific request. In this example, for screen data to be generated for each screen, the server 100 prepares two types of screen data respectively for the image processing apparatus 200 and the mobile terminal 300. These screen data have the same in terms of information to be input, but different in display size as the image processing apparatus 200 and the mobile terminal 300 have different display sizes.

Figure 7:
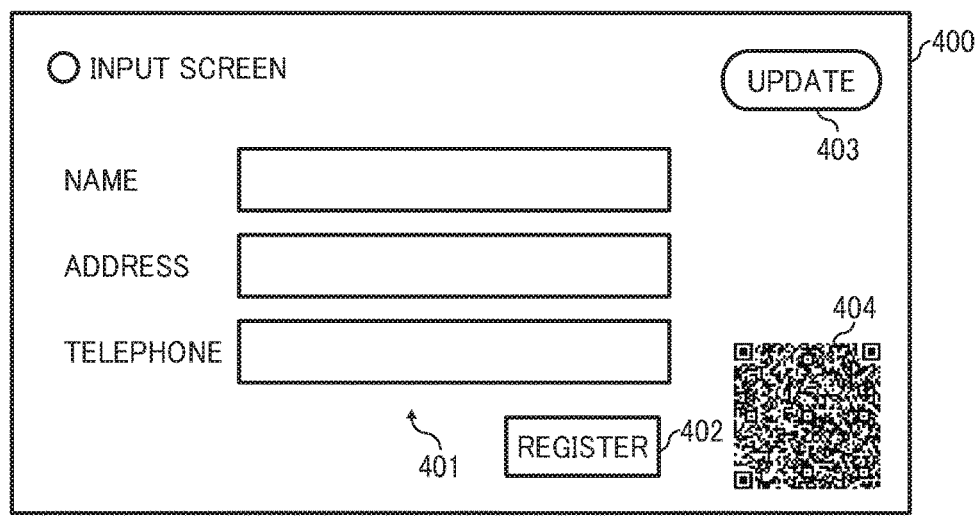
FIG. 7 is an illustration of an example input screen displayed by the image processing apparatus.
Figure 8:
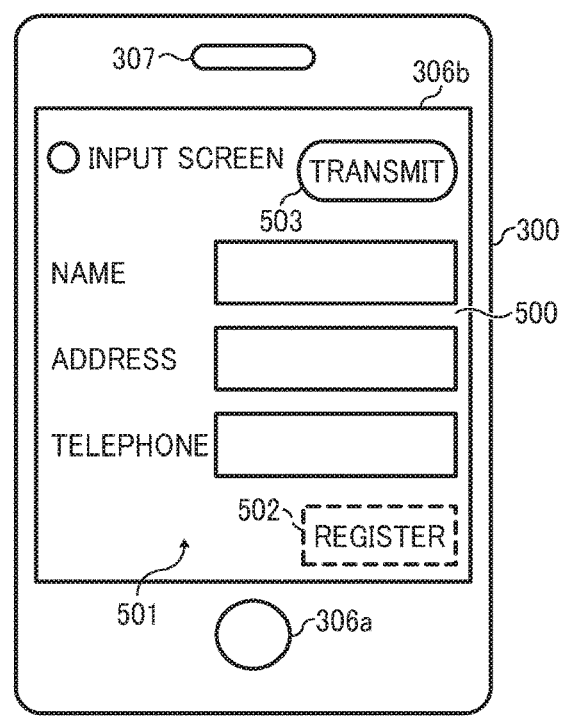
FIG. 8 is an illustration of an example input screen displayed by the mobile terminal.

In this embodiment, the user operates the mobile terminal 300 to input information to be registered to the image processing apparatus 200. If the screen for the image processing apparatus 200 includes an operation key, which instructs the image processing apparatus 200 to perform specific operation, the corresponding screen for the mobile terminal 300 may not include such operation key. For example, a "Register" key 402 included in a screen for the image processing apparatus 200 of FIG. 7 is selectable, but corresponding "Register" key 502 in a corresponding screen for the mobile terminal 300 of FIG. 8 is made invalid.

Referring back to FIG. 3, the image processing apparatus 200 includes a communication unit 211, a display 212, and an operation acceptor 213.

The communication unit 211, which corresponds to the communication I/F 205 that operates under control of the CPU 201, transmits a request to the server 100 in response to user operation received at the operation acceptor 213 to access the server 100. The communication unit 211 further causes the display 212 to display a screen based on a response received from the server 100 in response to the request.

The display 212, which corresponds to the display 206*b*, displays a screen to the user.

The operation acceptor 213, which corresponds to the operation device 206*a* such as the touch panel or keys operating under control of the CPU 201, receives user operation to the screen being displayed by the display 212. Examples of user operation include, but not limited to, inputting information, instructing to obtain a screen for input information, and instructing to execute operation based on the input information.

The mobile terminal 300 includes a communication unit 311, a display 312, an operation acceptor 313, an image reader 314, and a decoder 315.

The communication unit 311, which corresponds to the communication I/F 305, transmits a request to the server 100 based on the user operation received at the operation acceptor 313 or a decoded result by the decoder 315, to access the server 100. The communication unit 311 further causes the display 312 to display a screen based on a response transmitted from the server 100 in response to the request.

The display 312, which corresponds to the display 306*b*, displays a screen to the user.

The operation acceptor 313, which corresponds to the operation device 306*a* such as the touch panel or keys, receives user operation to the screen being displayed by the display 312. Examples of user operation include, but not limited to, inputting information, and instructing to register input information.

The image reader 314 corresponds to an image capturing device such as the camera 307. In this embodiment, the image reader 314 reads the code image on a screen that is displayed by the display 212 of the image processing apparatus 200.

The decoder 315, which corresponds to the instructions of the CPU 301, decodes the code image, read by the image reader 314, to generate a decoded result, and provides such decoded result to the communication unit 311.

Figure 4:
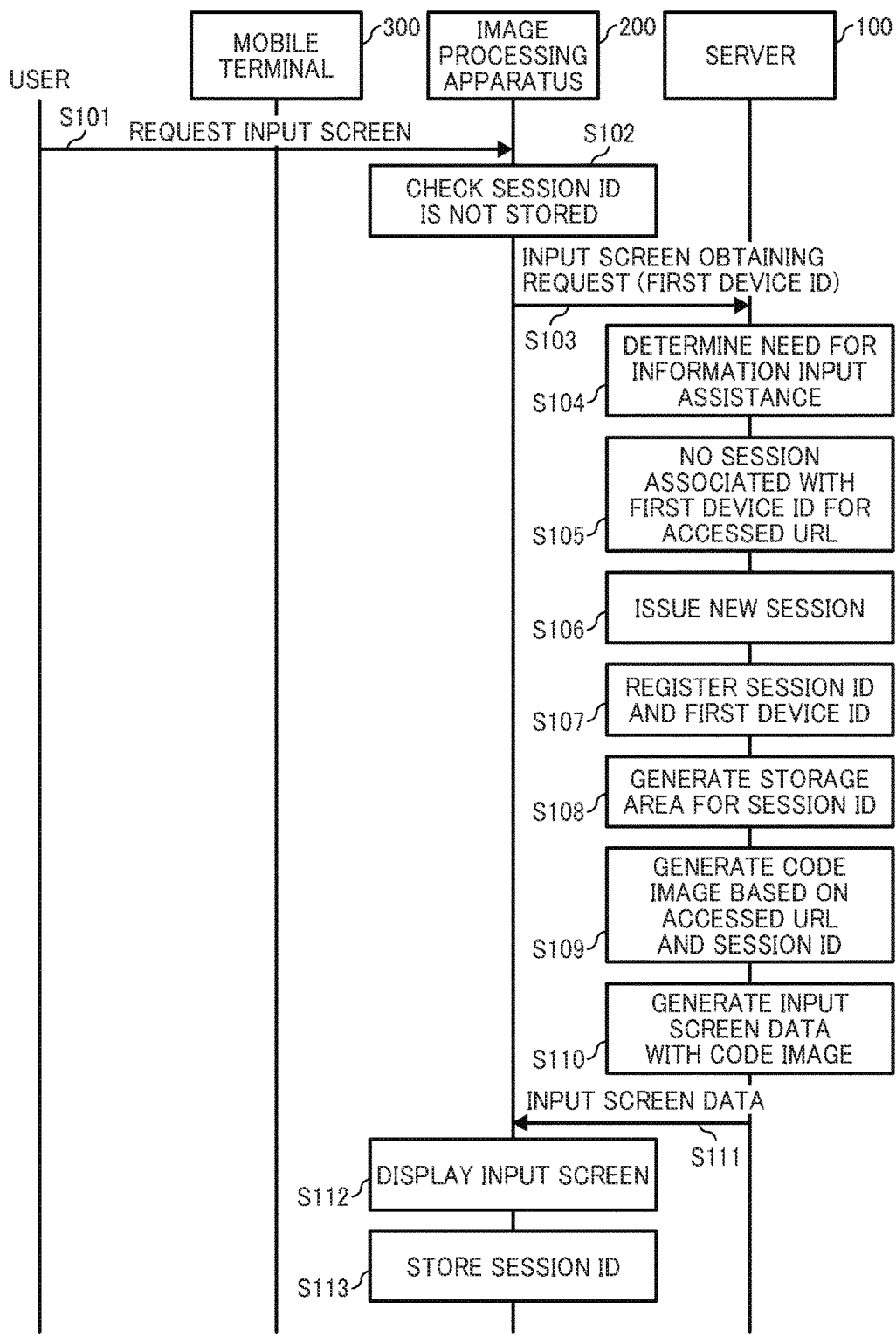
FIG. 4 is a data sequence diagram illustrating operation of processing a request for input screen for an image processing apparatus, with an information input assistance service, according to an embodiment of the present invention.
Figure 5:
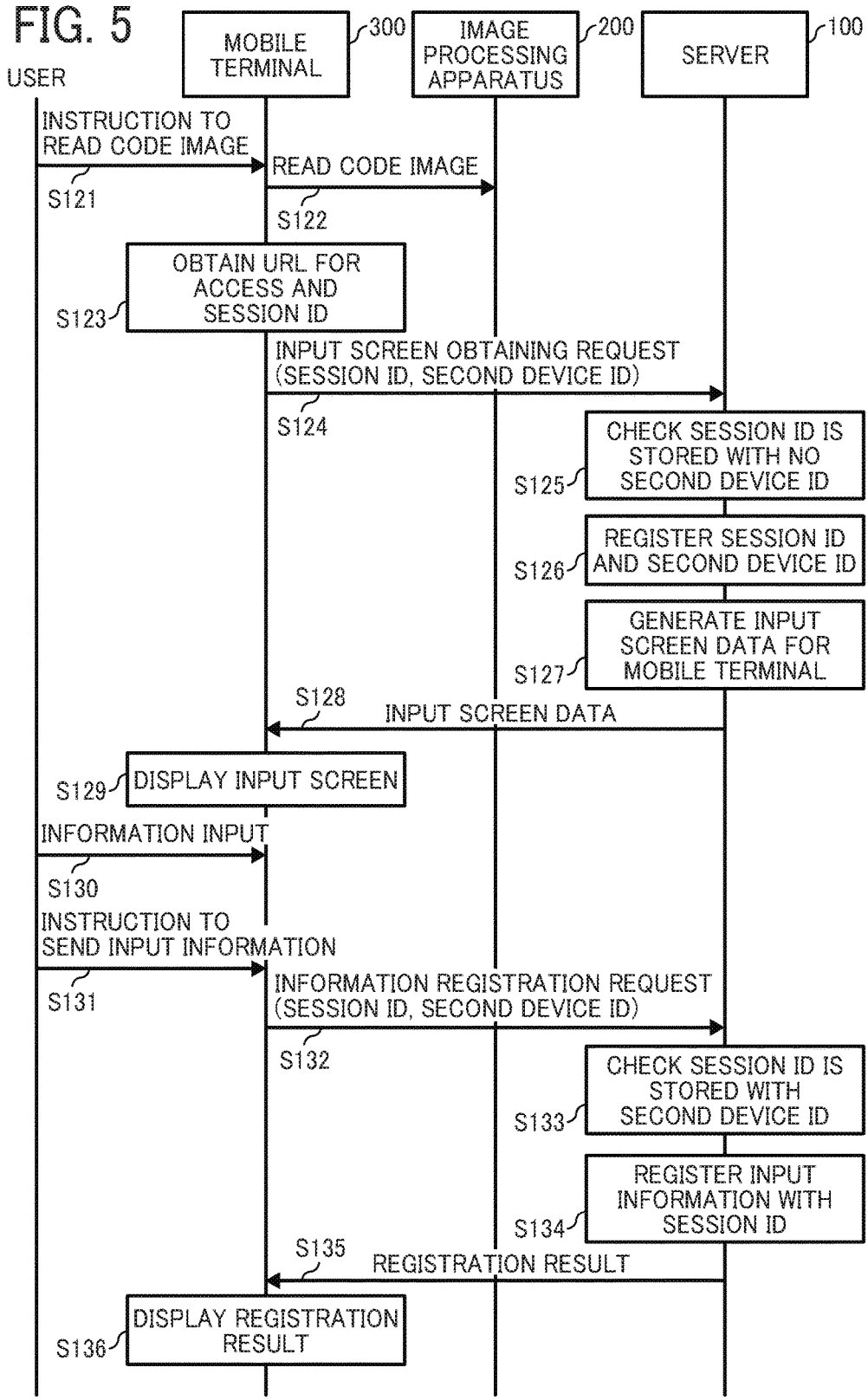
FIG. 5 is a data sequence diagram illustrating operation of processing a request for input screen for a mobile terminal, with an information input assistance service, according to an embodiment of the present invention.
Figure 6:
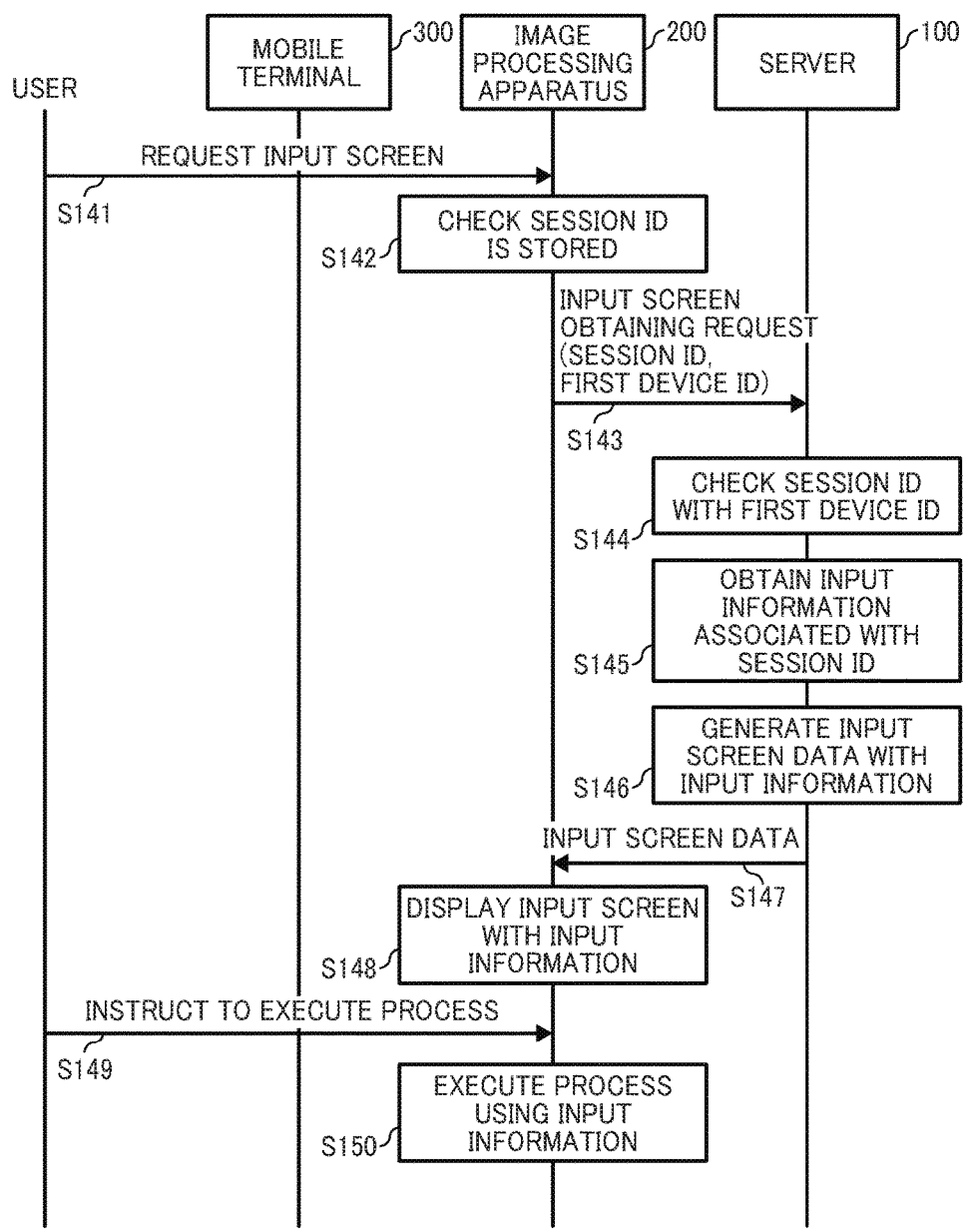
FIG. 6 is a data sequence diagram illustrating operation of processing a request for input screen that reflects a user input through the mobile terminal, according to an embodiment of the present invention.

Referring to FIGS. 4 to 6, operation of providing the information input assist service to the user operating the image processing apparatus 200, using the mobile terminal 300, is explained according to an embodiment of the present invention.

It is assumed that the user tries to use one of the functions provided by the image processing apparatus 200. At S101, the user requests the image processing apparatus 200 to obtain and display a screen for inputting information ("input screen") to execute the function desired by the user. The input screen is a screen that allows the user to input information to be used for executing the desired function of the image processing apparatus 200.

At S102, the image processing apparatus 200 determines whether a session ID is stored in a memory of the image processing apparatus 200, which identifies a session to be used for communicating with the server 100 for the input screen to be obtained. In this example, it is determined that such session ID is not stored in the image processing apparatus 200. More specifically, unless the image processing apparatus 200 previously displays the input screen that is requested by the user, the image processing apparatus 200 does not have the session ID stored in its memory for that input screen. If such session ID is stored, the image processing apparatus 200 performs S142 of FIG. 6 as described later.

At S103, the image processing apparatus 200 transmits a request for obtaining the input screen ("input screen obtaining request") to the server 100. The input screen obtaining request includes an identifier of the image processing apparatus 200, as the first device ID.

More specifically, in this example, the input screen obtaining request is transmitted as a GET request addressed to a specific URL to be accessed, in a manner that is interpretable by the web server (web manager 111) of the server 100, using the web browser function. In such case, the first device ID (in this example, the ID of the image processing apparatus 200) is added as a part of URL to be accessed as a variable. The image processing apparatus 200 stores the URL to be accessed in association with a type of screen to be requested. The server 100 stores the URL to be accessed for each screen to be provided.

The above S102 and S103 are performed by the communication unit 211 of the image processing apparatus 200.

At S104, the server 100, which receives the input screen obtaining request, determines that the image processing apparatus 200 requires information input assistance from the contents of the received request. For example, the server 100 may determine whether the image processing apparatus 200 is requesting information input assistance, based on a format of the first device ID, a version of the web browser being used by the image processing apparatus 200 in accessing, and an identification code transmitted with the input screen obtaining request. Based on determination that the image processing apparatus 200 requests information input assistance, the server 100 proceeds to S105 to start providing the information input assistance service.

At S105, the server 100 determines that no session has been registered in association with the first device ID included in the input screen obtaining request, for example, by referring to the session management table of FIG. 11. If the server 100 determines that there is a session associated with the first device ID, and such session corresponds to a URL other than the URL that has been accessed this time, the server 100 disregards this session, and proceeds to S106. If the server 100 determines that the registered session corresponds to the URL that has been accessed this time, the server 100 determines that the session has been issued at S105, and sends a response indicating that the session has been issued to the image processing apparatus 200 without proceeding to S106.

The above S104 and S105 are performed by the device determiner 112.

At S106, the server 100 issues a new session. More specifically, the server 100 generates a session ID for the new session.

At S107, the server 100 registers, in the session management table of FIG. 11, the session ID that is generated for the new session, in association with the first device ID included in the input screen obtaining request. The server 100 further registers the URL that has been accessed this time in the session management table in association with the session ID and the first device ID.

The above S106 and S107 are performed by the session issuer 113 and the session manager 114. In this example, the session ID is identification information identifying a communication between the image processing apparatus 200 and the server 100.

At S108, the server 100 creates a record in the input information table of FIG. 12, which corresponds to the session ID of the session that is issued at S106. S108 is performed by the information registrar 116.

At S109, the server 100 encodes the URL that has been accessed this time, and the session ID generated at S106, into a code image. The URL that has been accessed this time is an URL, which is to be accessed at any time when requesting for assistance in inputting information to a specific input screen that is requested. S109 is performed by the code image generator 115.

At S110, the server 100 generates input screen data for the image processing apparatus 200, which is embedded with the generated code image, based on screen data that is previously prepared. This input screen data does not yet have information that is input. The input screen data may include the session ID. S110 may be performed by the screen generator 117.

At S111, the server 100 transmits the generated input screen data to the image processing apparatus 200 in response to the request received at S103. S111 is performed by the web manager 111. With this response having the code image, the server 100 is able to notify the image processing apparatus 200 of the session ID that is generated at S106 and the URL to be accessed.

At S112, the image processing apparatus 200, which receives the response at S111, displays the input screen including the code image, based on the received screen data. Through displaying the code image, which can be captured by the mobile terminal 300, the image processing apparatus 200 is able to provide the session ID that is transmitted from the server 100, to the mobile terminal 300. S112 is performed by the communication unit 211 and the display 212.

At S113, the image processing apparatus 200 stores the session ID that is transmitted from the server 100, in a memory as a session ID corresponding to the currently-displayed screen.

The image processing apparatus 200 may display an input screen 400 of FIG. 7 at S112. The input screen 400 of FIG. 7 includes an information input area 401, a "Register" key 402, an "Update" key 403, and a code image 404.

The information input area 401 is an area for entering information input by the user. The user may directly enter information to the information input area 401 using the control panel 206 of the image processing apparatus 200, without using the input information assistance service provided by the server 100 in cooperation with the mobile terminal 300.

The "Register" key 402, when selected, instructs the image processing apparatus 200 to execute a specific function using the information entered in the information input area 401. In this example illustrated in FIG. 7, the input screen 400 is a screen for registering transmission destination information in an address book of the image processing apparatus 200. In such case, the "Register" key 402, when selected, registers the entered information in the address book.

The "Update" key 403, when selected, instructs the image processing apparatus 200 to update the input screen 400 using the information that is input with the mobile terminal 300.

The code image 404 is generated by the server 100 at S109. The mobile terminal 300 captures the code image with the camera 307, and decodes the captured code image to obtain information necessary to start operation of assisting in inputting information as described below referring to FIG. 5.

Referring to FIG. 5, at S121, the mobile terminal 300 receives a user instruction for executing the camera function to read the code image. At S122, the mobile terminal 300 reads the code image 404, and decodes the read code image 404 to generate a decoded result. At S123, the mobile terminal 300 obtains the URL to be accessed, and the session ID to be used for access, from the decoded result. S122 and S123 are performed by the image reader 314 and the decoder 315.

At S124, the mobile terminal 300 transmits a request for obtaining an input screen ("input screen request") to the server 100. The input screen request includes an identifier identifying the mobile terminal 300 as the second device ID, and the obtained session ID. The transmission destination of the input screen request is the URL to be accessed, which is obtained from the decoded result. The input screen request is transmitted as a GET request to the web server, using the web browser function. More specifically, the second device ID and the session ID may be added to the URL to be accessed as a variable. S124 is performed by the communication unit 311.

At S125, the server 100 determines that the session ID included in the input screen request has been registered in the session management table of FIG. 11, but no second device ID that is associated with the registered session ID. S125 is performed by the device determiner 112. When the server 100 determines that the session ID has not been registered, or the second device ID has been registered in association with the session ID included in the input screen request, the server 100 sends a response indicating that the screen cannot be displayed for use to the mobile terminal 300. This prevents more than one mobile terminal 300 to enter information to the same screen. In order to allow more than one mobile terminal 300 to enter information to the same screen, the server 100 may register more than one second device ID in the session management table.

In this example, it is assumed that the session ID has been registered, but without any second device ID. In such case, at S126, the server 100 registers the second device ID in the session management table of FIG. 11, in association with the session ID that matches the session ID included in the input screen request. S126 is performed by the session manager 114.

At S127, the server 100 generates input screen data for the mobile terminal 300, which corresponds to the URL that has been accessed, based on screen data that has been previously prepared. The input screen data does not yet have information that is input. S127 is performed by the screen generator 117.

At S128, the server 100 transmits the generated input screen data to the mobile terminal 300 in response to the request received at S124. S128 is performed by the web manager 111.

At S129, the mobile terminal 300, which receives the response at S128, displays the input screen based on the received screen data. S129 is performed by the communication unit 311 and the display 312.

The mobile terminal 300 may cause the display 306b to display an input screen 500 of FIG. 8 at S129. The input screen 500 of FIG. 8 includes an information input area 500, which corresponds to the information input area 400 of the screen for the image processing apparatus 200 as illustrated in FIG. 7. The input screen 500 further includes a "Register" key 502 and a "Transmit" key 503. FIG. 8 additionally illustrates a key 306a (a part of the input device 306a) and the camera 307 that are provided at a surface of the mobile terminal 300.

The information input area 501 is an area for entering information input by the user. The information input area 501 has entries that are the same as the entries of the information input area 401 of FIG. 7. The user may use various functions of the mobile terminal 300 to easily enter information in the information input area 501. For example, the mobile terminal 300 may be provided with the copy-and-paste function and the predictive conversion function to assist the user in entering information.

The "Register" key 502, which corresponds to the "Register" key 402 of the screen for the image processing apparatus 200, is made invalid. In this example, the screen of FIG. 8 includes the "Register" key 502 so as to make the appearance similar to that of the screen of FIG. 7. The "Register" key 502 does not have to be displayed on the screen for the mobile terminal 300.

The "Transmit" key 503, when selected, transmits information input to the information input area 501 to the server 100 to register such input information.

Referring back to FIG. 5, at S130, the mobile terminal 300 receives information that is input by the user through the input screen 500 being displayed at the mobile terminal 300. The information input through the input screen 500 is information to be input through the input screen 400 for the image processing apparatus 200.

As the user enters necessary information and selects the "Transmit" key 503, at S131, the user terminal 300 receives a user instruction for transmitting input information. At S132, the mobile terminal 300 transmits a request for registering input information to the server 100. The request for registering input information includes the session ID and the second device ID. This request may further include the input information. Alternatively, the user terminal 300 may transmit the input information, after confirming that the input information can be registered.

Further, in this example, the transmission destination of the request for registering is the URL to be accessed, which is the same URL accessed at S124. The request for registering is transmitted as a POST request to the web server using the web browser function, such that the request for registering can be distinguished from the request for obtaining the input screen.

At S133, the server 100, which receives the request for registering the input information at S132, determines that the session ID included in the request has been registered in the session management table of FIG. 11 in association with the second device ID. S133 is performed by the device determiner 112.

When the session ID has not been registered, or when the session ID is not associated with the second device ID, the server 100 transmits a response indicating that the input information cannot be registered, to the mobile terminal 300. This indicates that the session is not valid, or the mobile terminal 300 does not have a right to register information for that session. In this example, it is assumed that the session ID has been registered in association with the second device ID. In such case, at S134, the server 100 registers the input information that is transmitted from the mobile terminal 300 with the request for registering, in the input information table of FIG. 12 in association with the session ID included in the request for registering. S134 is performed by the information registrar 116.

Figure 9:
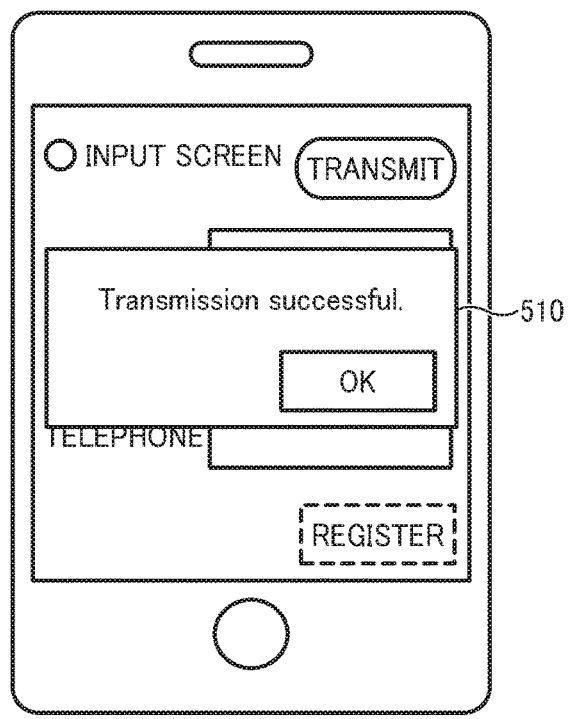
FIG. 9 is an illustration of a pop-up window displayed by the mobile terminal.
Figure 10:
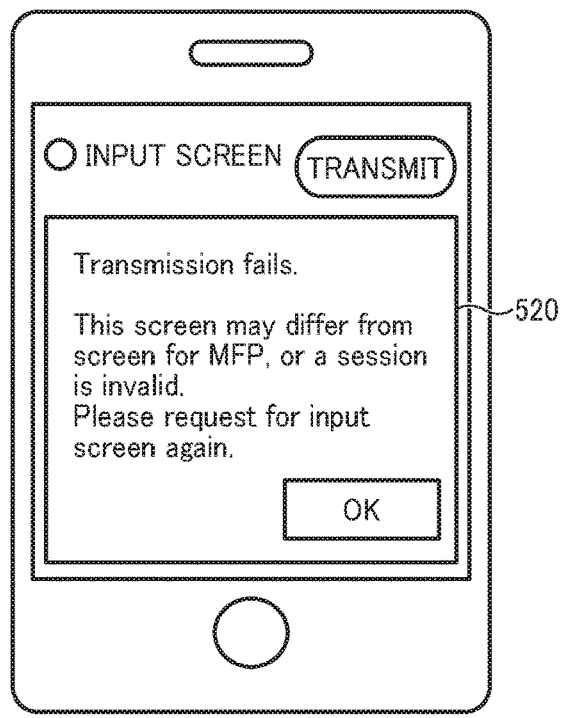
FIG. 10 is an illustration of a pop-up window displayed by the mobile terminal.

At S135, the server 100 transmits a result of registration (in this example, the result indicating that registration is successful) to the mobile terminal 300 in response to the request received at S132. At S136, the mobile terminal 300 displays a pop-up screen 510 as illustrated in FIG. 9, to notify the user of completion of registration. If registration is not successful, the mobile terminal 300 displays a pop-up screen 520 of FIG. 10.

As described above, the user operates the mobile terminal 300 to input information, which is to be input to the input screen 400 for the image processing apparatus 200, and transmits such input information to the server 100 to register such input information.

Referring to FIG. 6, as the user selects the "Update" key 403 of the input screen 400 for the image processing apparatus 200, at S141, the image processing apparatus 200 receives a user instruction for obtaining an input screen. At this time, the user instruction requests to update the input screen.

At S142, the image processing apparatus 200 determines that the session ID to be used for communication with the server 100 in relation to the screen to be obtained is stored. More specifically, this session ID is the session ID that has been stored at S113 of FIG. 4. When it is determined that the session ID has been stored, at S143, the image processing apparatus 200 transmits a request for obtaining an input screen to the server 100. The request for obtaining the input screen includes the session ID, and an identifier of the image processing apparatus 200 as the second device ID.

It is assumed that the image processing apparatus 200 stores the session ID at S142. Further, in this example, the request for obtaining the input screen is transmitted as a GET request to the web server using the web browser function. In such case, the session ID and the first device ID are added as a part of URL to be accessed as a variable. In this manner, the server 100 is able to distinguish between the request for obtaining the input screen for the first time (S103) and the request for obtaining the input screen for the succeeding time (S143), based on a determination of whether or not the session ID is included in the request for obtaining the input screen. The image processing apparatus 200 previously stores the URL to be accessed in association with a type of screen to be requested.

At S144, the server 100, which receives the request for obtaining the input screen at S143, refers to the session management table of FIG. 11 to determine whether the session ID included in the request is stored in association with the first device ID. S144 is performed by the session manager 114. In this example, the server 100 checks that the session ID is stored in association with the first device ID, and determines a type of request as updating the screen.

At S145, the server 100 obtains the input information, which is registered in association with the session ID, from the input information table of FIG. 12. S145 is performed by the information registrar 116.

At S146, the server 100 generates input screen data for the image processing apparatus 200, based on the screen data that is previously prepared. At this time, the input screen data includes the input information that is obtained. More specifically, the generated screen adds the input information obtained at S145 to the data generated at S110. S146 is performed by the screen generator 117.

At S147, the server 100 transmits the generated screen data to the image processing apparatus 200 in response to the request received at S143. S147 is performed by the web manager 111.

At S148, the image processing apparatus 200, which receives the response at S147, displays the input screen having the input information, based on the screen data. S148 is performed by the communication unit 211 and the display 212.

As the user selects the "Register" key 402 on the screen being displayed at S148, at S149, the image processing apparatus 200 receives a user instruction for executing a specific operation using the input information being displayed on the screen. In this example, the user instruction instructs to register the input information, such as the transmission destination information, in the address book of the image processing apparatus 200.

At S150, the image processing apparatus 200 executes the specific operation using the input information. More specifically, in this example, the image processing apparatus 200 registers the transmission destination information that is input, in the address book of the image processing apparatus 200.

As described above, the server 100 generates an input screen having input information that is input by the mobile terminal 300 and registered at the server 100, and transmits such input screen to the image processing apparatus 200 for display to the user. The user further instructs the image processing apparatus 200 to execute specific operation using the input information.

Thus, the user can use a user interface of the mobile terminal 300 to enter information to the image processing apparatus 200. That is, the user can efficiently input information with the user interface of the mobile terminal 30, which is more suitable for entering information such as characters.

In order to use this function, the mobile terminal 300 only needs to have a web browser and a network I/F to access the server 100, and an image capturing device such as a camera to read the code image displayed on the display of the image processing apparatus 200. Since such functions are already provided for the general-purpose mobile terminal 300 such as a smart phone, the user can easily request for the information input assistance service.

In the above-described embodiment, the image processing apparatus 200 encodes the URL to be accessed and the session ID into the code image for display. Alternatively, the image processing apparatus 200 may notify the user at the mobile terminal 300 of such information in any other method. For example, the image processing apparatus 200 may transmit information indicating the URL to be accessed and the session ID to the mobile terminal 30, according to the near field communication (NFC) or the Bluetooth, or infrared. In another example, the image processing apparatus 200 may output information indicating the URL to be accessed and the session ID in the form of voice data.

In such case, the image processing apparatus 200 may be provided with an application programming interface (API) that outputs information through an interface. The server 100 may embed a script for causing output of such information into image data using the API. The browser of the image processing apparatus 200 can then execute the extracted script to call the API to output the information indicating the URL to be accessed and the session ID in any desired format.

Figure 13:
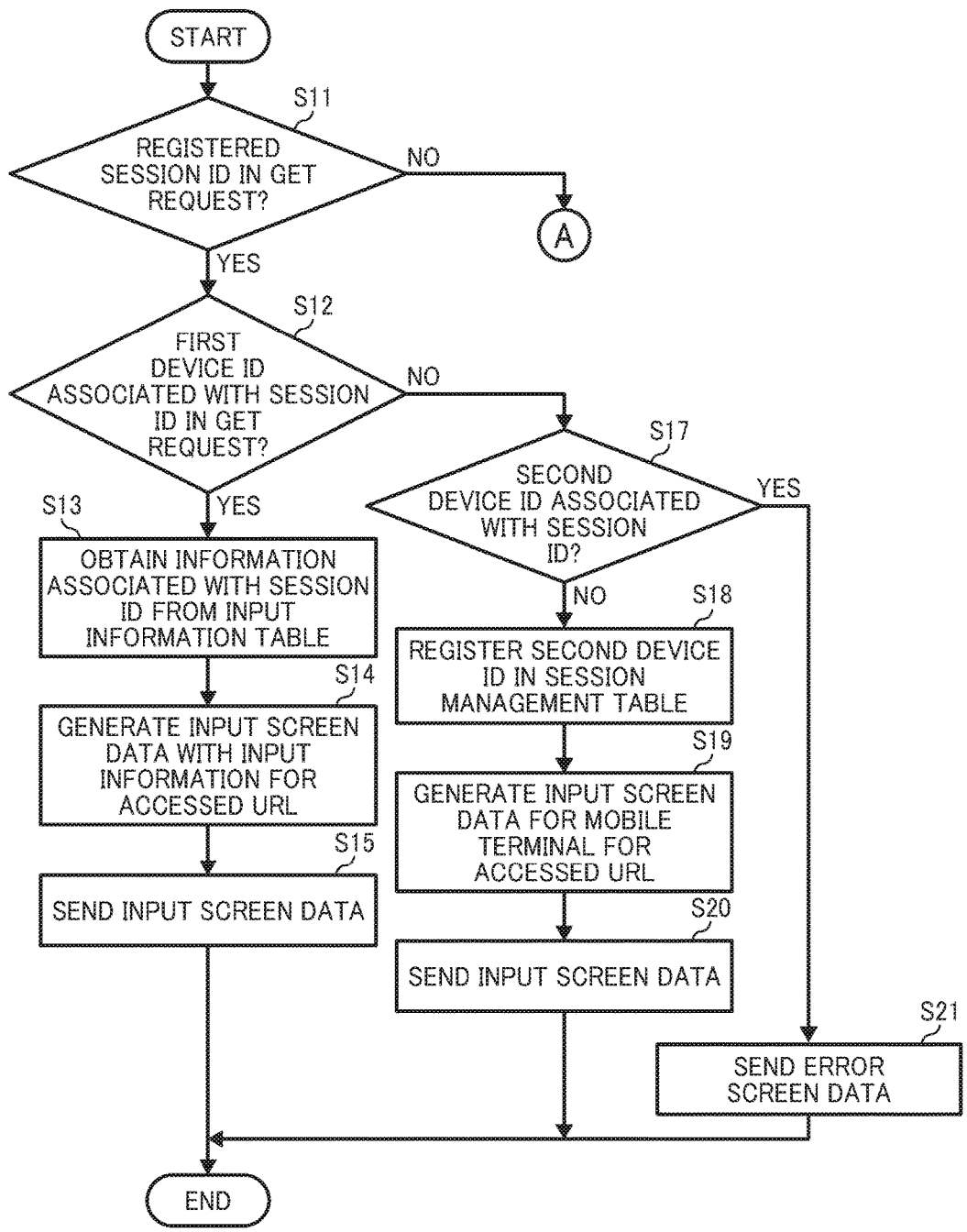
FIGS. 13 and 14 are a flowchart illustrating operation of processing a GET request, performed by the server of FIG. 1, according to an embodiment of the present invention.
Figure 14:
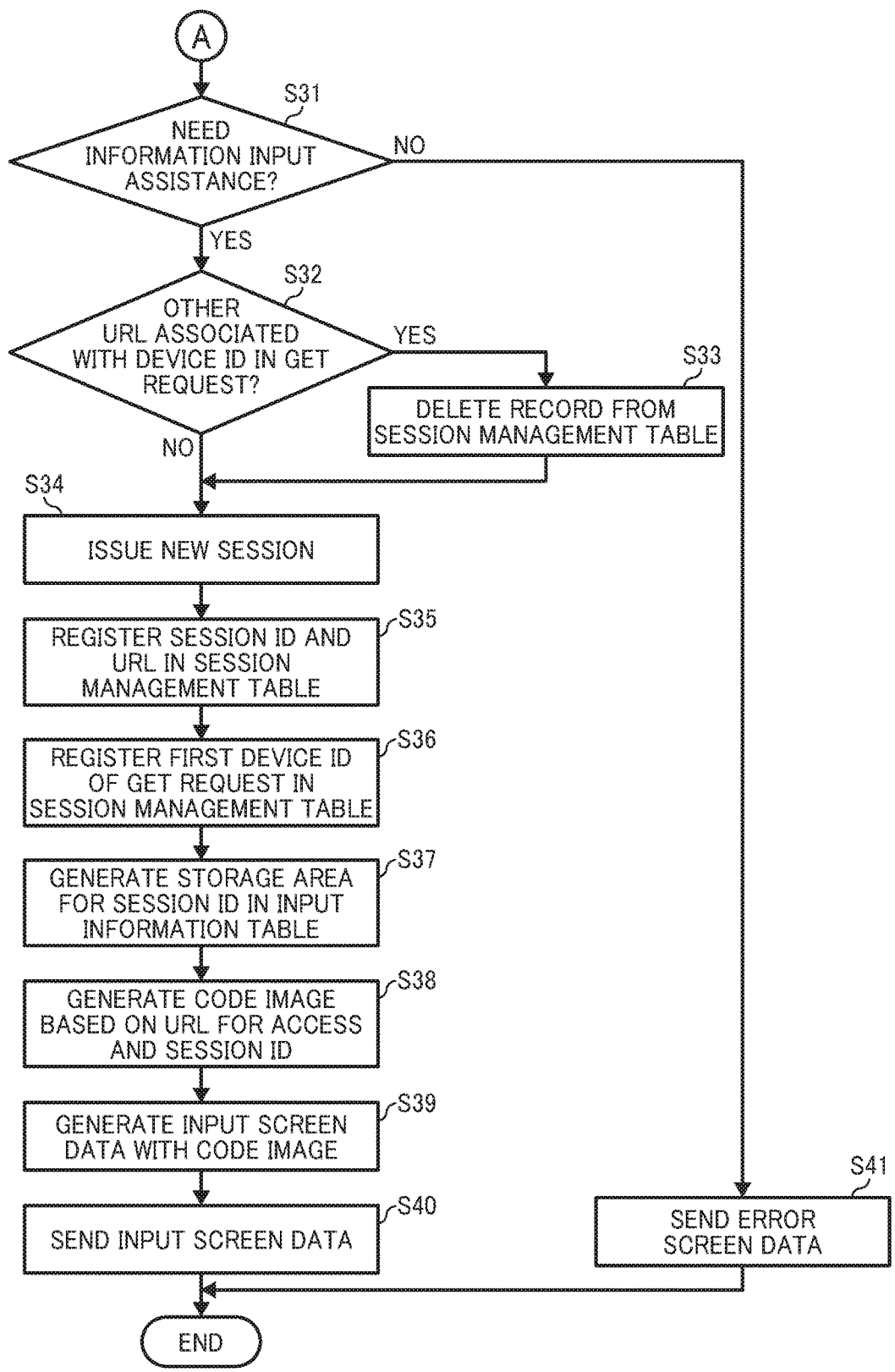

Now, operation of assisting information input, performed by the CPU 101 of the server 100, is described according to an embodiment of the present invention. FIGS. 13 and 14 illustrate the example case in which the GET request is received at S103 of FIG. 4, S124 of FIG. 5, or S143 of FIG. 6. More specifically, the CPU 101 of the server 100 performs operation of FIGS. 13 and 14, when the CPU 101 determines that the web manager 111 receives from the external apparatus a GET request for the URL corresponding to any input screen.

At S11, the CPU 101 determines whether the received GET request includes a session ID, which has been registered in the session management table. When it is determined that the session ID has been registered ("YES" at S11), at S12, the CPU 101 determines whether the GET request includes a first device ID, which is associated with that session ID in the session management table.

When it is determined that the GET request includes the first device ID, which has been registered ("YES" at S12), the CPU 101 determines that the received GET request corresponds to a request for obtaining the input screen that reflects input information of the mobile terminal, as described above referring to S143 of FIG. 6.

The CPU 101 further performs S13 to S15, which correspond to S144 to S146 of FIG. 6, to generate screen data having input information, which is obtained from the input information table, and transmits the screen data to a device that sends the GET request (in this example, the image processing apparatus 200).

When it is determined that the GET request does not include the first device ID that is registered at S12 ("NO" at S12), the CPU 101 determines whether the session ID and the second device ID in the received GET request have been registered in association in the session management table. When it is determined that the second device ID associated with the session ID is not registered at S17 ("NO" at S17), the CPU 101 determines that the received GET request corresponds to a request for obtaining the input screen for the mobile terminal, as described above referring to S124 of FIG. 5.

The CPU 101 further performs S18 to S20, which correspond to S125 to S127 of FIG. 5, to register the mobile terminal 300 that has accessed, generate input screen data having no input information, and transmits the input screen data to a device that transmits the GET request (in this example, the mobile terminal 300).

As described above, when the received GET request includes the session ID and the first device ID, which are registered in association in the session management table, but no second session is registered in association, the server 100 transmits input screen data to the request sender device.

Here, the CPU 101 does not have to check specific content of the device ID included in the GET request. Since the request including the registered session ID, which has not been associated with the second device ID in the session management table, can be only sent from a device operated by the user who is near the image processing apparatus 200 displaying (or transmitting) such information regarding the session ID, it is assumed that authentication of the device with the device ID is not necessary.

When it is determined that the second device ID in the received GET request is associated with the session ID at S17 ("YES"), the CPU 101 determines not to allow registration. At S21, the CPU 101 transmits data of an error screen to the device that sends the GET request, and the operation ends.

When it is determined that the received GET request does not include the session ID that has been registered ("NO" at S11), the operation proceeds to S31 of FIG. 14. At S31, the CPU 101 determines whether the device that sends the GET request is the image processing apparatus capable of receiving the information input assist service, as described above referring to S104 of FIG. 4.

When it is determined that the device that sends the GET request is the image processing apparatus capable of receiving the information input assist service ("YES" at S31), the CPU 101 determines that the received GET request corresponds to a request for obtaining the input screen as described above referring to S103 of FIG. 4.

At S32, the CPU 11 further determines whether the device ID included in the received GET request is registered in the session management table in association with a URL other than the URL accessed by the request sender device. When it is determined that the device ID of the request is associated with other URL ("YES" at S32), the CPU 101 determines that the image processing apparatus 200 that sends the GET request is using (accessing) an input screen other than an input screen to be generated. At S33, the CPU 101 then deletes a record of the other URL from the session management table, and the operation proceeds to S34 to newly create a record for the request that is just received. When it is determined that the device ID of the request is not associated with the other URL ("NO" at S32), the operation proceeds directly to S34 without performing S33.

At S34, the CPU 101 performs S34 to S40, which correspond to S106 to S110 of FIG. 4, to issue a new session, register the first device ID and the newly generated session ID in the session management table, and transmit generated input screen data including the code image to the request sender device.

When it is determined that the device that sends the GET request is not the image processing apparatus with the information input assist service ("NO" at S31), the CPU 101 does not issue a new session, but proceeds to S41 to transmit data of an error screen to the request sender device.

Figure 15:
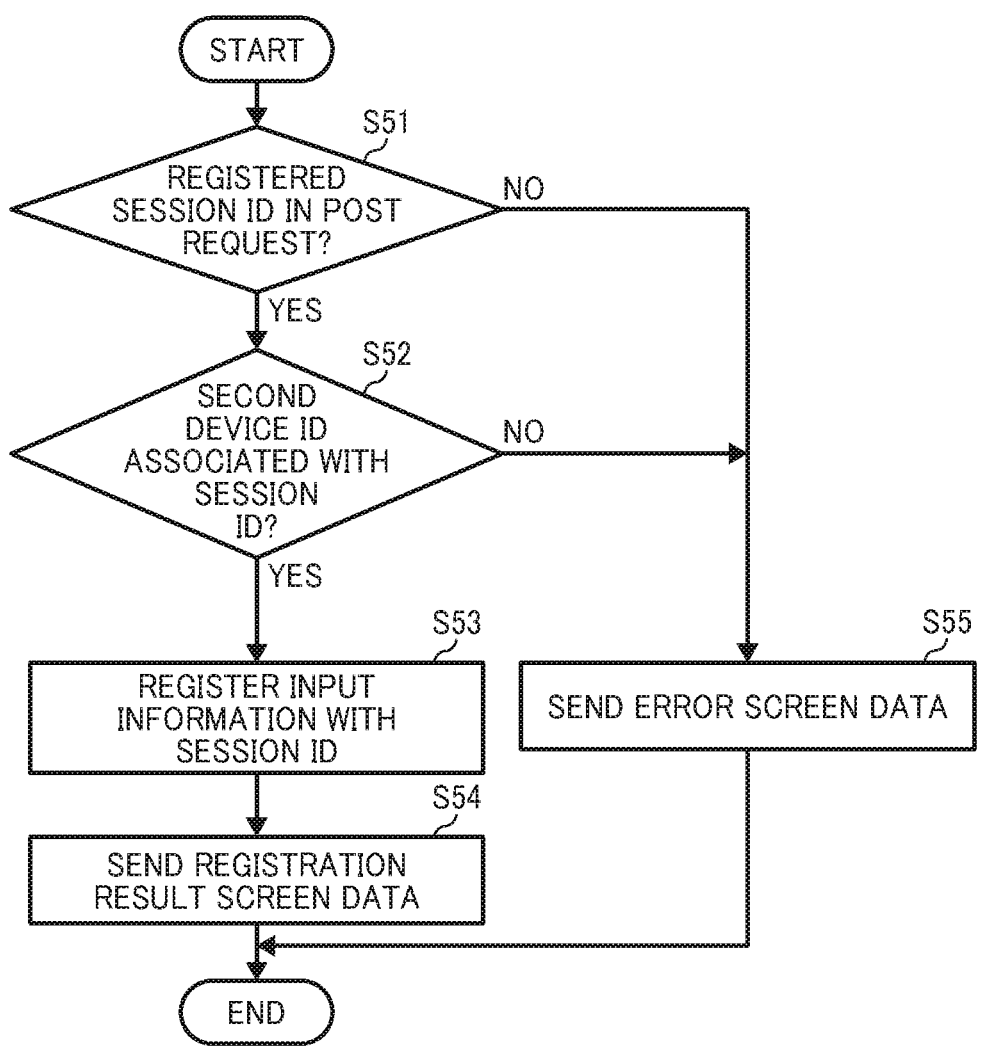
FIG. 15 is a flowchart illustrating operation of processing a POST request, performed by the server of FIG. 1, according to an embodiment of the present invention.

Referring now to FIG. 15, operation of processing a POST request, performed by the CPU 101 of the server 100, is explained according to an embodiment of the present invention. The POST request may be transmitted, for example, at S132 of FIG. 5. More specifically, the CPU 101 of the server 100 performs operation of FIG. 15, when the CPU 101 determines that the web manager 111 received from the external apparatus a POST request for the URL corresponding to any input screen.

At S51, the CPU 101 determines whether the received POST request includes a session ID, which has been registered in the session management table. When it is determined that the session ID has been registered ("YES" at S51), at S52, the CPU 101 determines whether the POST request includes a second device ID, which is associated with that session ID in the session management table.

When it is determined that the POST request includes the second device ID, which has been registered ("YES" at S52), the CPU 101 determines that the received POST request corresponds to a registration request for registering input information, as described above referring to S132 of FIG. 5.

The CPU 101 further performs S53 and S54, which correspond to S133 and S134 of FIG. 5, to register input information in the POST request in the input information table, and transmit a result of registration to the device that sends the POST request.

When it is determined that the POST request does not include the session ID at S51 ("NO" at S51), or the POST request does not include the second device ID at S52 ("NO" at S52), the CPU 101 determines that the received POST request is not transmitted from the mobile terminal 300 that has been registered to receive the information input assist service. The CPU 101 then performs S54 to transmit data of an error screen to the request sender device, and the operation ends.

Referring to FIGS. 16 to 19, an information processing system is described according to an embodiment of the present invention. In this embodiment, in alternative to transmitting screen data including input information to the image processing apparatus 200, the server 100 transmits the input information itself, which is input by the mobile terminal 300, to the image processing apparatus 200. The image processing apparatus 200 reflects the received input information to an input screen for display.

Figure 16:
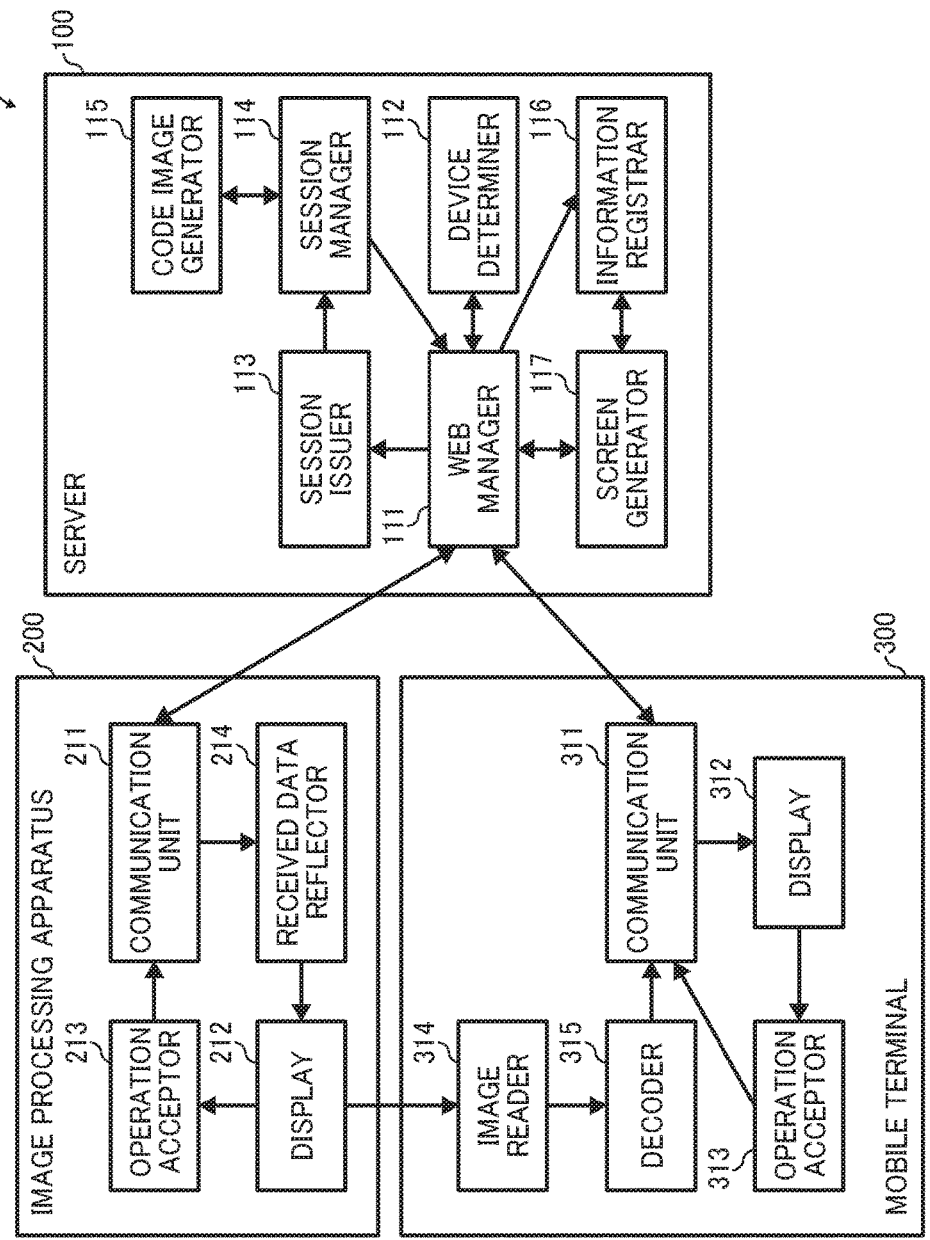
FIG. 16 is a schematic block diagram illustrating a functional configuration of the information processing system of FIG. 1, according to an embodiment of the present invention.

FIG. 16 is a schematic block diagram illustrating a functional configuration of the information processing system 1 according to the embodiment of the present invention. The functional configuration of the image processing system 1 of FIG. 16 is substantially similar to that of the image processing system of FIG. 3, except that a part of the functions performed by the screen generator 117 is now performed by a received data reflector 214 of the image processing apparatus 200. As illustrated in FIG. 16, the image processing apparatus 200 includes the received data reflector 214, in addition to the units of the image processing apparatus 200 of FIG. 3. The received data reflector 214 is implemented by the instructions of the CPU 201.

In using the information input assist service using the mobile terminal 300, the received data reflector 214 reflects input information, which is received by the communication unit 211 from the server 100, onto an input screen, while the input screen is being displayed by the display 212. The received data reflector 214 may further request the user to determine whether to reflect the input information to the input screen, before reflecting.

Further, in this embodiment, the screen generator 117 of the server 100 does not generate input screen data for the image processing apparatus 200 having the input information that is received from the mobile terminal 300.

Figure 17:
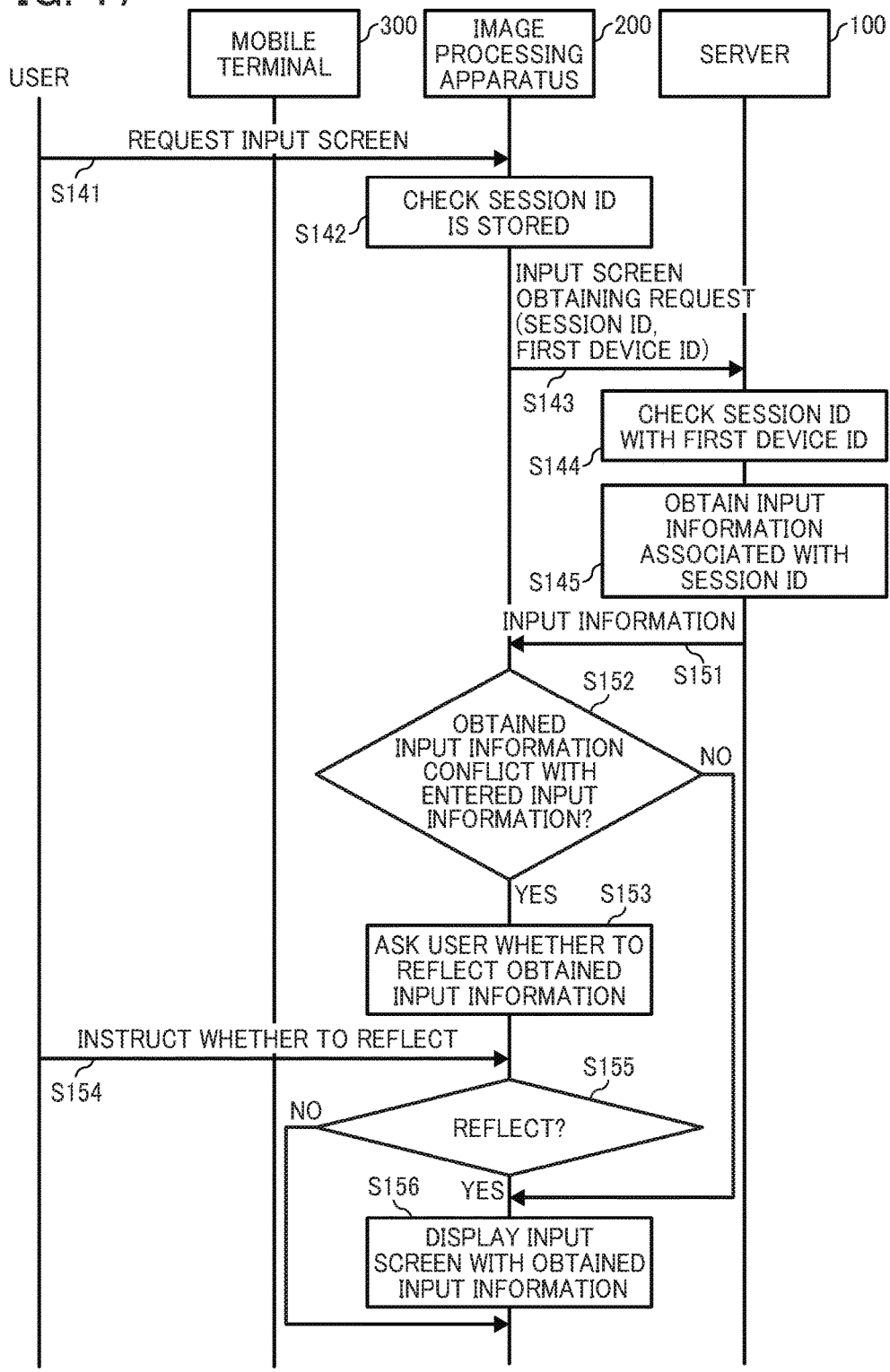
FIG. 17 is a data sequence diagram illustrating operation of processing a request for input information that is input by a user through the mobile terminal, performed by the information processing system of FIG. 16, according to an embodiment of the present invention.

Referring to FIG. 17, operation of providing the information input assist service to the user operating the image processing apparatus 200 of FIG. 16, using the mobile terminal 300, is explained according to the embodiment of the present invention.

S141 to S145 are performed in a substantially similar manner as described above referring to S141 to S145 of FIG. 6.

At S151, the server 100 transmits the input information, which is obtained from the input information table at S145, to the image processing apparatus 200 in response to the input screen obtaining request received at S143.

At S152, the image processing apparatus 200 determines whether any part of the input information received from the server 100 conflicts with any part of input information that has been already input through the input screen being displayed on the display 212 (206*b*) of the image processing apparatus 200. For example, when the received input information has an item of information, which differs from an item of information that has been input but does not have the null value, the image processing apparatus 200 determines that the input information conflicts. If there is any item of information on the input screen that has not been entered, the image processing apparatus 200 determines that the input information does not conflict at least for that item of information.

When it is determined that any item of information of the input information conflicts at S152 ("YES" at S152), the operation proceeds to S153. At S153, the image processing apparatus 200 asks the user whether to reflect the received input information onto the input screen. For example, the image processing apparatus 200 may cause the display 212 to display a pop-up window 410 of FIG. 18. The pop-up window 410 displays, for an item of information having the input information conflicting with each other, the entered input information and the received input information, side by side.

Figure 18:
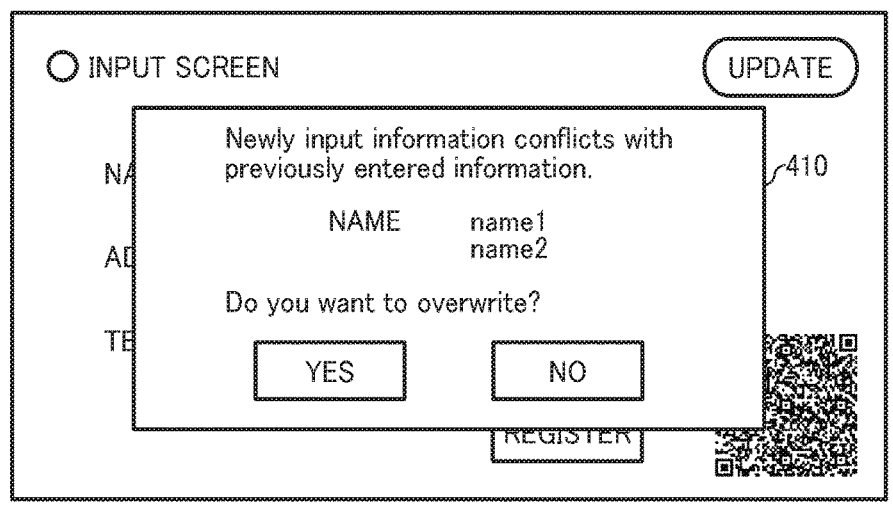
FIG. 18 is an illustration of a pop-up window displayed by the image processing apparatus of FIG. 16.
Figure 19:
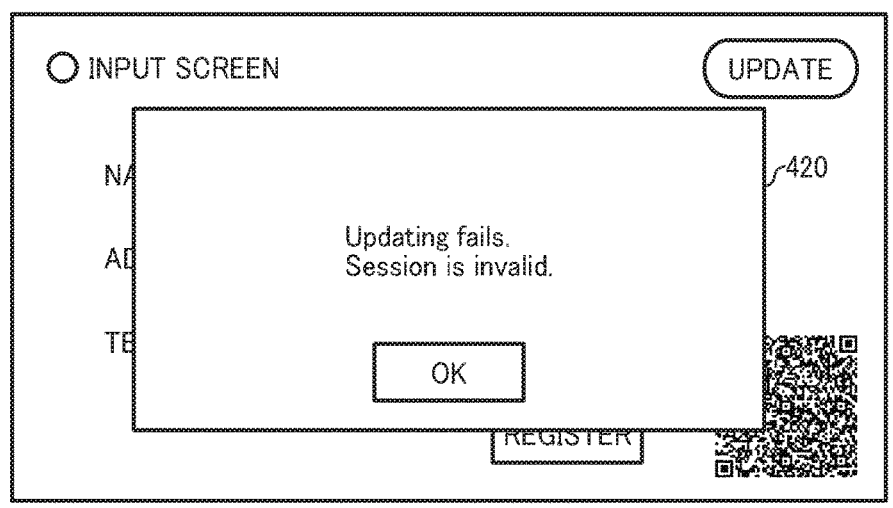
FIG. 19 is an illustration of a pop-up window displayed by the image processing apparatus of FIG. 16.

The user then selects either "YES" or "NO" on the pop-up window of FIG. 18. In response to receiving a user instruction indicating whether to reflect at S154, at S155, the image processing apparatus 200 selects whether to reflect the received input information. When the received input information is to be reflected ("YES" at S155), at S156, the image processing apparatus 200 displays the input screen having the received input information reflected. When the received input information is not to be reflected ("NO" at S155), S156 is not performed, such that the input information that has been already entered is not updated.

Referring back to S152, when there is no conflict between the received input information and the registered input information, the image processing apparatus 200 does not perform S153 to S155, and causes the display 212 to display the input screen having the received input information reflected at S156.

As described above, according to this embodiment of FIGS. 16 to 18, the image processing apparatus 200 is able to confirm with the user whether to reflect the input information, which is input using the mobile terminal 300, before reflecting such input information on the input screen of the image processing apparatus 200, in case there has been input information already registered. With this configuration, any item of input information, which has been registered at the image processing apparatus 200, can be efficiently used.

Further, in this embodiment, when there is no access for a predetermined time period after registering the session ID at S107 of FIG. 4, the server 100 may newly register the session ID to create a new record. With this function, the session ID that has not been used for a while is not kept stored.

In such case, the session ID, which has been registered, may have been deleted by the time when the request for obtaining the input screen is received at S144 of FIG. 17. The server 100 transmits an error at S151 in response to the request at S144, for example, in the form of pop-up window 420 of FIG. 19. The operation of FIG. 4 is then performed to obtain a new session ID.

Figure 20:
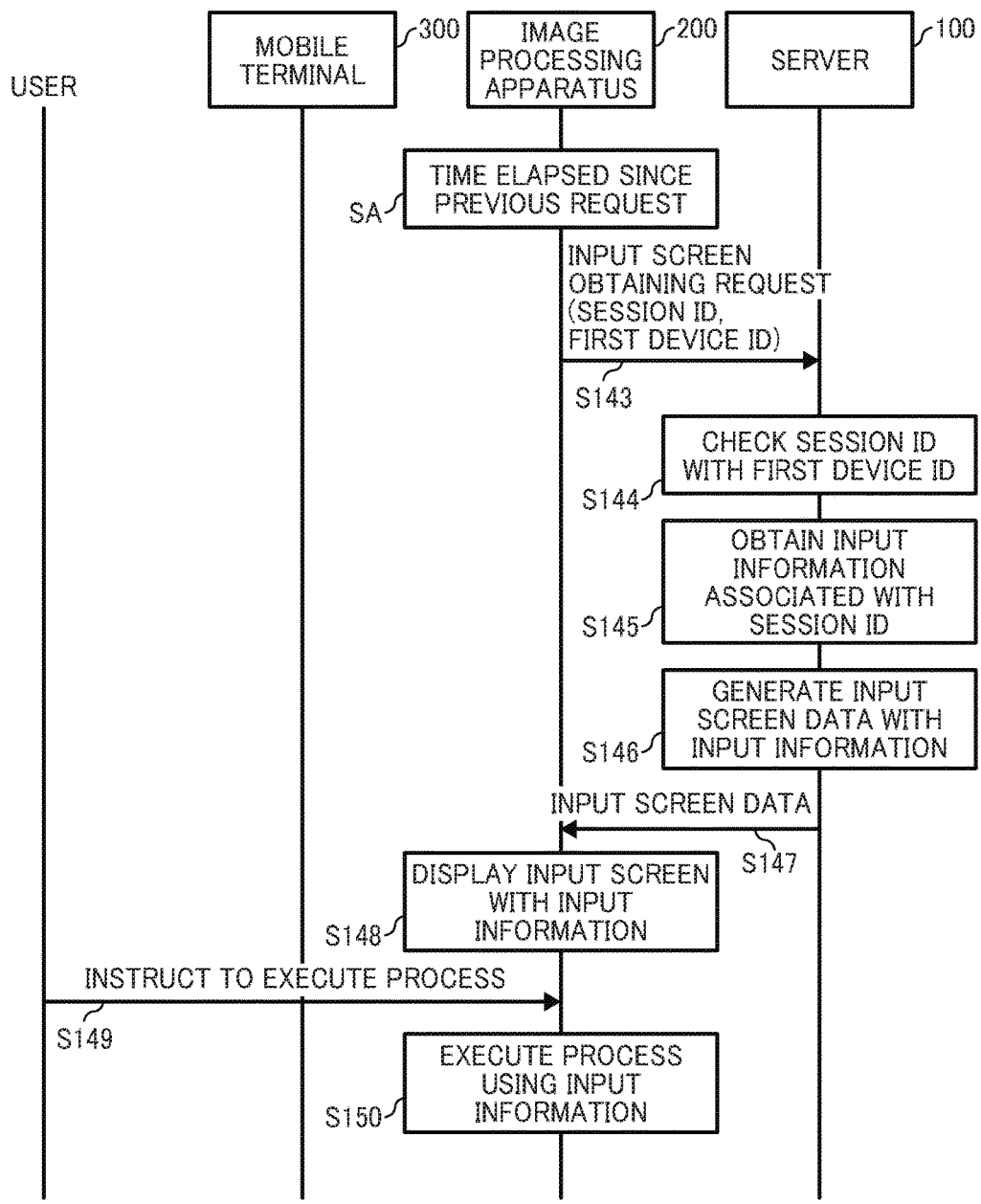
FIG. 20 is a data sequence diagram illustrating operation of processing a request for input screen that reflects a user input through the mobile terminal, performed by the information processing system of FIG. 3 or 16, according to an embodiment of the present invention.
Figure 21:
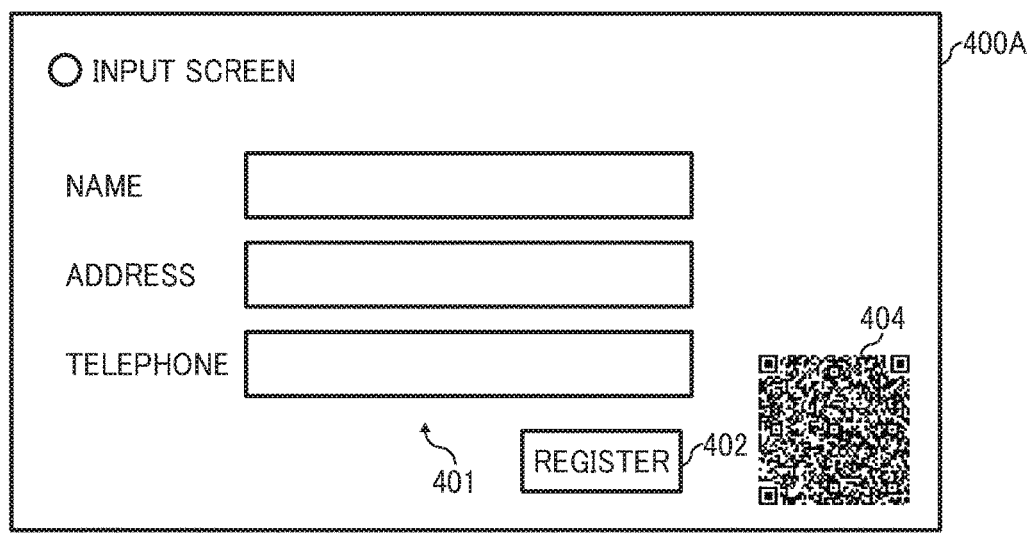
FIG. 21 is an illustration of an input screen displayed by the image processing apparatus.

Referring to FIGS. 20 and 21, the information processing system 1 of FIG. 3 or 16 may perform operation of providing the information input assist service differently than the above-described operation of FIG. 6 or 17. More specifically, the image processing apparatus 200 that displays the input screen at S112 of FIG. 4 periodically accesses the server 100 without waiting for the user instruction, to try to obtain the input information from the server 100.

The operation of FIG. 20 is substantially similar to the operation of FIG. 6, except for the replacement of S141 and S142 with the step SA.

At SA, the image processing apparatus 200 determines that a predetermined time period elapses since the last time when the request for obtaining the input screen is transmitted for a session with the session ID that has been registered. The image processing apparatus 200 automatically performs S143 to transmit the request for obtaining the input screen to the server 100. These steps SA and S143 may be repeated, for example, every predetermined time or any desired time.

Since the image processing apparatus 200 automatically updates the input screen, the user does not have to request the server 100 to transmit the input information, which is received from the mobile terminal 300, to the image processing apparatus 200 to reflect such input information on the input screen of the image processing apparatus 200. With this function, as illustrated in an input screen 400A of FIG. 21, the input screen of the image processing apparatus 200 does not have to be provided with the "Update" key 403 of FIG. 7.

Referring to FIGS. 22 to 27, the image processing system 1 of FIG. 3 or 16 may cause the server 100 to additionally register input information that is input through the input screen of the image processing apparatus 200, such that the mobile terminal 300 can receive the input information input at the image processing apparatus 200.

Figure 22:
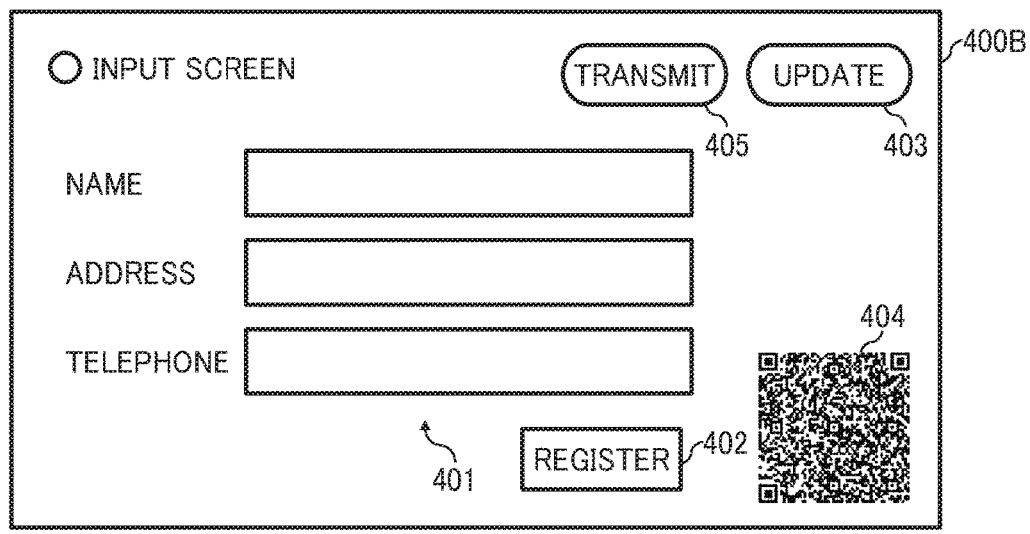
FIG. 22 is an illustration of an input screen displayed by the image processing apparatus.

FIG. 22 illustrates an input screen to be displayed by the display 212 of the image processing apparatus 200, which corresponds to the input screen of FIG. 7 being displayed at S112 of FIG. 4.

The input screen 400 additionally includes a "Transmit" key 405. The "Transmit" key 405, when selected, causes the image processing apparatus 200 to transmit the input information on the information input area 401 to the server 100 for registration.

Figure 23:
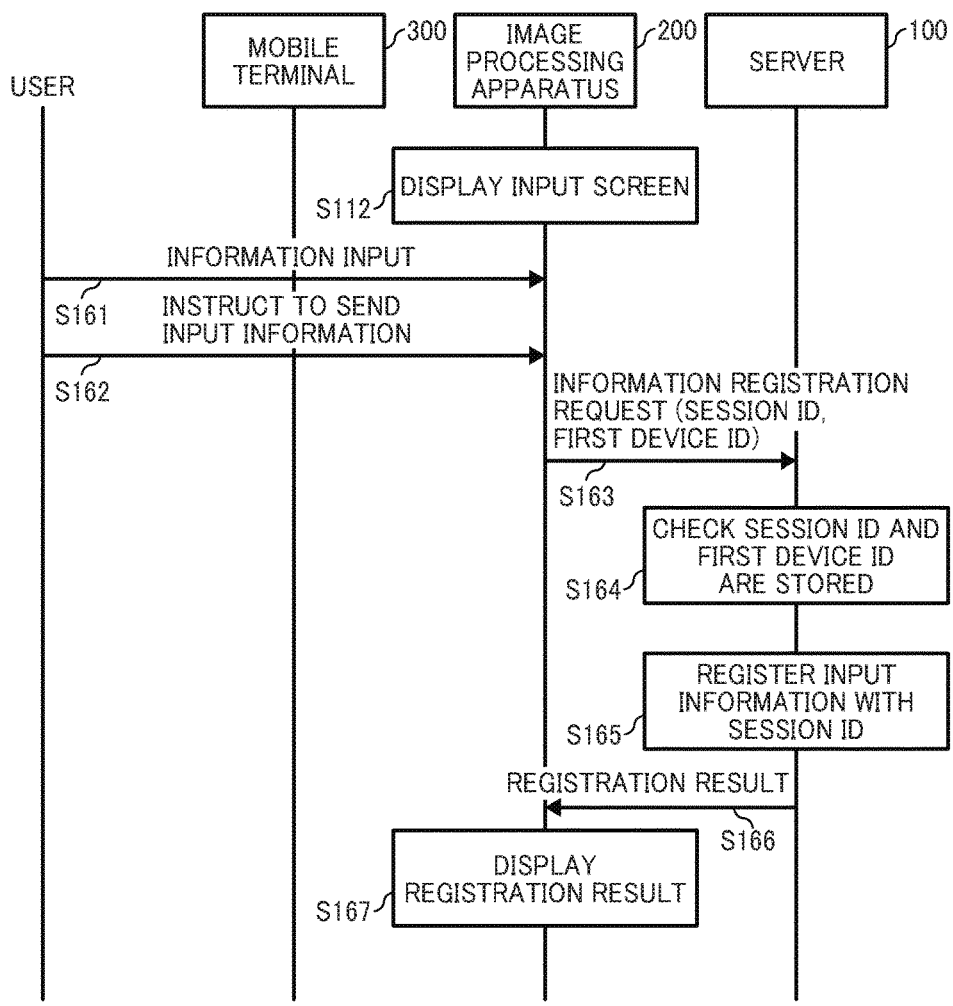
FIG. 23 is a data sequence diagram illustrating operation of processing a request for registering input information input by the image processing apparatus, performed by the information processing system of FIG. 3 or 16, according to an embodiment of the present invention.

FIG. 23 is a data sequence diagram illustrating operation of transmitting input information that is input to the image processing apparatus 20 to the server 100 for display at the mobile terminal 300.

The image processing apparatus 200 displays the input screen 400B of FIG. 22 as described above referring to S112 of FIG. 4. At S161, the user inputs information to the information input area 401 of the input screen 400B, and the CPU 201 of the image processing apparatus 200 receives such input information.

In response to selection of the "Transmit" key 405 by the user, at S162, the image processing apparatus 200 receives an instruction for transmitting input information to the server 100.

At S163, the image processing apparatus 200 transmits a registration request for registering the input information to the server 100, in a substantially similar manner as described above referring to S132 of FIG. 5. The registration request includes the session ID and the identifier of the image processing apparatus 200 as the first device ID. This registration request corresponds to the registration request at S132.

At S164, the server 100, which receives the registration request at S163, determines that the session ID included in the second registration request is registered in the session management table in association with the first device ID. S164 is performed by the device determiner 112.

In this example, it is assumed that the server 100 determines that the session ID of the request is registered in association with the first device ID. At S165, the server 100 registers the input information, which is transmitted with the registration request, in the input information table in association with the session ID of the registration request. If the input information table stores the previously registered information, such information is overwritten with the newly registered input information. S165 is performed by the information registrar 116.

At S166, the server 100 transmits a result of registration (in this example, the result indicating that registration is successful) to the image processing apparatus 200, in response to the registration request at S163.

Figure 24:
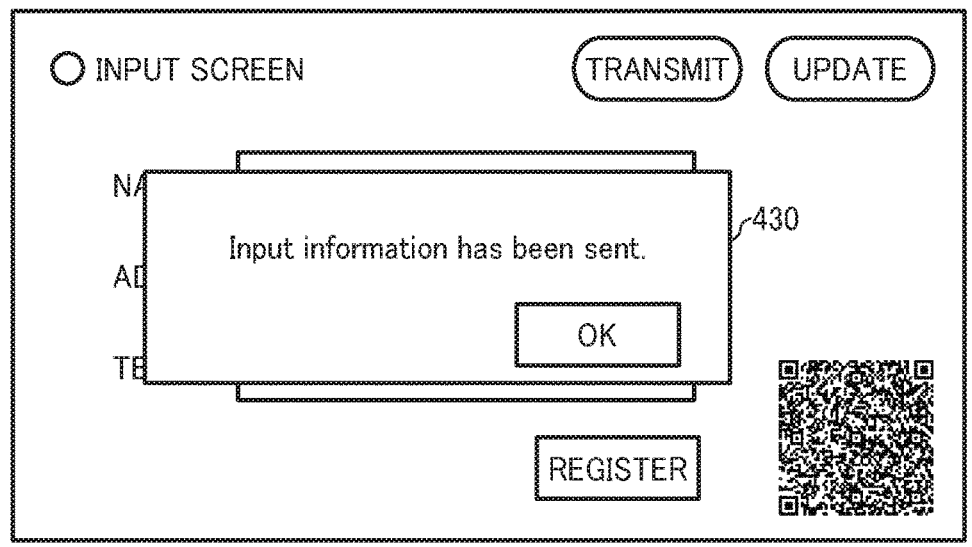
FIG. 24 is an illustration of a pop-up window displayed by the image processing apparatus.
Figure 25:
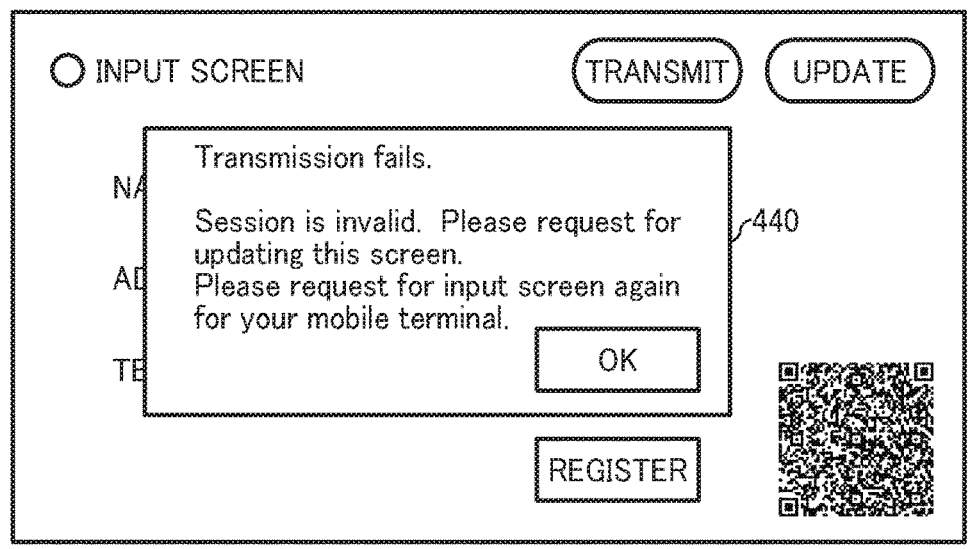
FIG. 25 is an illustration of a pop-up window displayed by the image processing apparatus.

At S167, the image processing apparatus 200 notifies the user of the registration result, such as by displaying a pop-up window 430 of FIG. 24. In case registration is not successful, the image processing apparatus 200 displays a pop-up window 440 of FIG. 25.

As described above, the user operates the image processing apparatus 200 to register input information, which is input through the input screen 400 of the image processing apparatus 200, to the server 100.

In performing the above-described operation, at S52 of FIG. 15, even when the received POST request includes the session ID and the first device ID, which are registered in the session management table, the operation proceeds to S53.

Further, at S54, the server 100 determines whether to generate the screen data for the image processing apparatus 200 or the screen data for the mobile terminal 300, based on whether the POST request includes the first device ID or the second device ID at S52.

Figure 26:
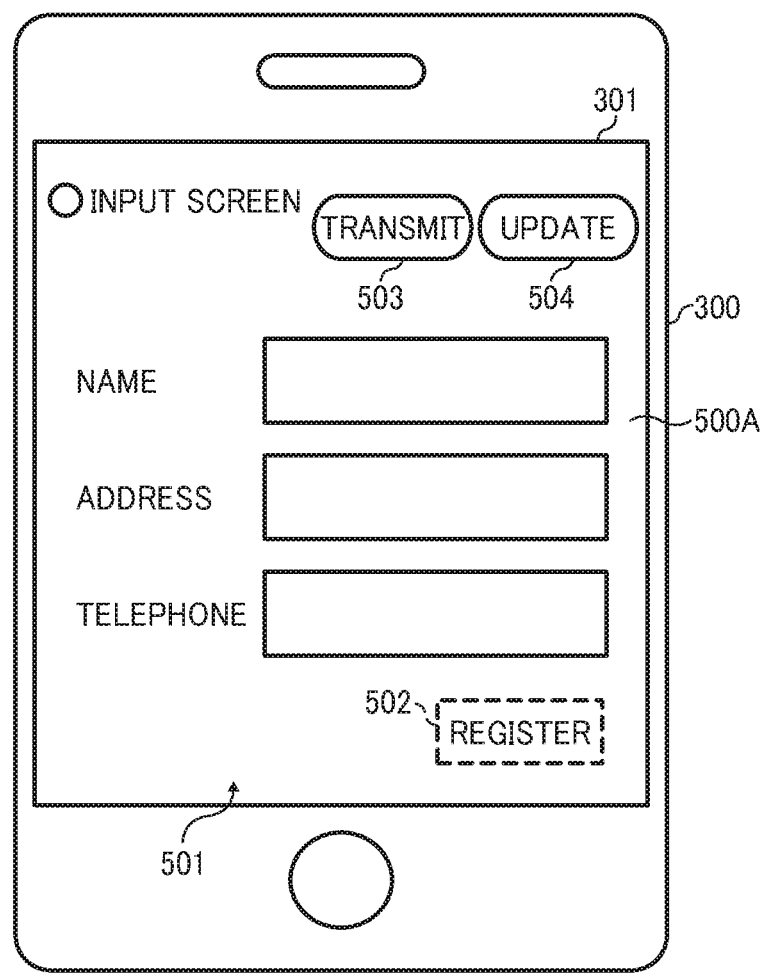
FIG. 26 is an illustration of an input screen displayed by the mobile terminal.

FIG. 26 is an example input screen 500A to be displayed at the mobile terminal 300, which corresponds to the screen of FIG. 8 being displayed at S129 of FIG. 5. The input screen 500A additionally includes an "Update" key 504, compared to the input screen 500 of FIG. 8. The "Upate" key 504, when selected, instructs the server 100 to update the input screen 500A based on the input information registered in the server 100, in a substantially similar manner as described above referring to the "Update" key 403 of the input screen 400 of FIG. 7.

Figure 27:
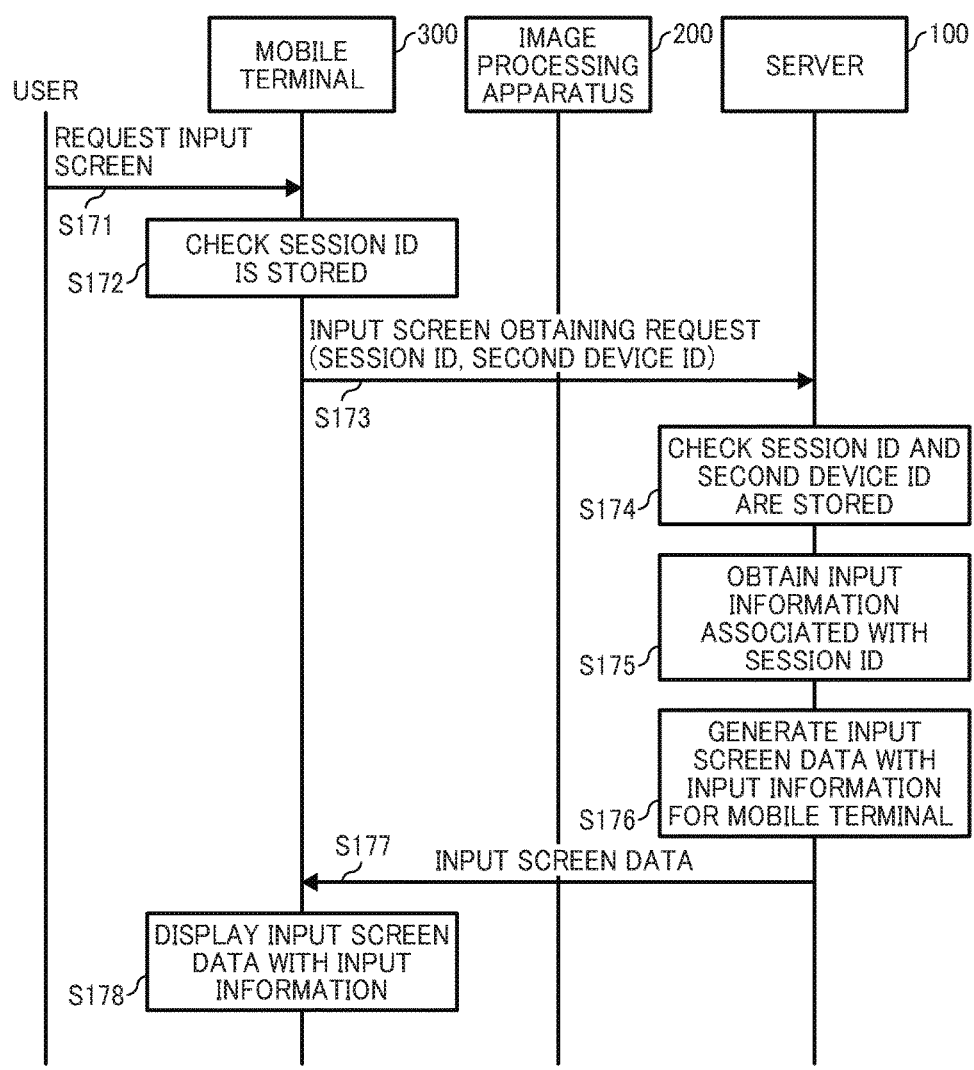
FIG. 27 is a data sequence diagram illustrating operation of processing a request for reflecting input information registered to the image processing apparatus through operation of FIG. 23, according to the embodiment of the present invention.

FIG. 27 is a data sequence diagram illustrating operation of updating the input screen of the mobile terminal 300 in response to selection of the "Update" key 403, according to the embodiment.

After the mobile terminal 300 displays the input screen 500A in a substantially similar manner as described above referring to FIG. 5 at S129, the user selects the "Update" key 504 at any desired time. In response to selection of the "Update" key 504 at S171, the mobile terminal 300 receives a user instruction for obtaining the input screen.

At S172, the mobile terminal 300 determines that the session ID obtained at S123 has been stored in a memory of the mobile terminal 300. At S173, the mobile terminal 300 transmits a obtaining request for obtaining the input screen to the server 100, in a substantially similar manner as described above referring to S143 of FIG. 6. The obtaining request includes the session ID and the second device ID. This obtaining request is addressed to the URL, which is obtained at S123 of FIG. 5.

At S174, the server 100, which receives the obtaining request at S173, refers to the session management table to determine that the session ID and the second device ID included in the request is stored in association. S174 is performed by the session manager 114.

At S175, the server 100 obtains the input information, which is registered in association with the session ID of the obtaining request, from the input information table. S175 is performed by the information registrar 116.

At S176, the server 100 generates input screen data for the mobile terminal 300 having the obtained input information, based on screen data that is previously prepared. This input screen data has the input information obtained at S175 reflected on the data generated at S127. S176 is performed by the screen generator 117.

At S177, the server 100 transmits the generated screen data to the mobile terminal 300, in response to the obtaining request received a S173. S177 is performed by the web manager 111.

At S178, the mobile terminal 300, which receives the response at S177, displays the input screen having the input information, based on the received screen data. S178 is performed by the communication unit 211 and the display 212.

The user may add information to the input information being displayed, or modify the input information with other information, and registers addition or modification to the input information to the server 100, in a substantially similar manner as described above referring to S131 of FIG. 5.

As described above, the user operates the mobile terminal 300 to obtain input information, which is input by the image processing apparatus 200 and registered at the server 100, and reflects the obtained input information on the input screen for the mobile terminal 300.

In the above-described operation, the server 100 performs operation of FIG. 13 differently. More specifically, at S12 of FIG. 13, the server 100 further determines whether the received GET request includes the session ID and the second device ID, which are stored in the session management table in association with each other. Based on the determination indicating that the session ID and the second device ID are registered ("YES"), the operation proceeds to S13.

Further, at S14 of FIG. 13, the server 100 determines whether to generate screen data for the image processing apparatus 200 or screen data for the mobile terminal 300 at S14, based on determination of whether the received GET request includes the first device ID or the second device ID at S12.

As described above, in this embodiment, the server 100 can share input information between the image processing apparatus 200 and the mobile terminal 300. This allows the user to select either one of the user interface for the image processing apparatus 200 and the user interface for the mobile terminal 300, to input information, thus improving operability for the user.

Figure 28:
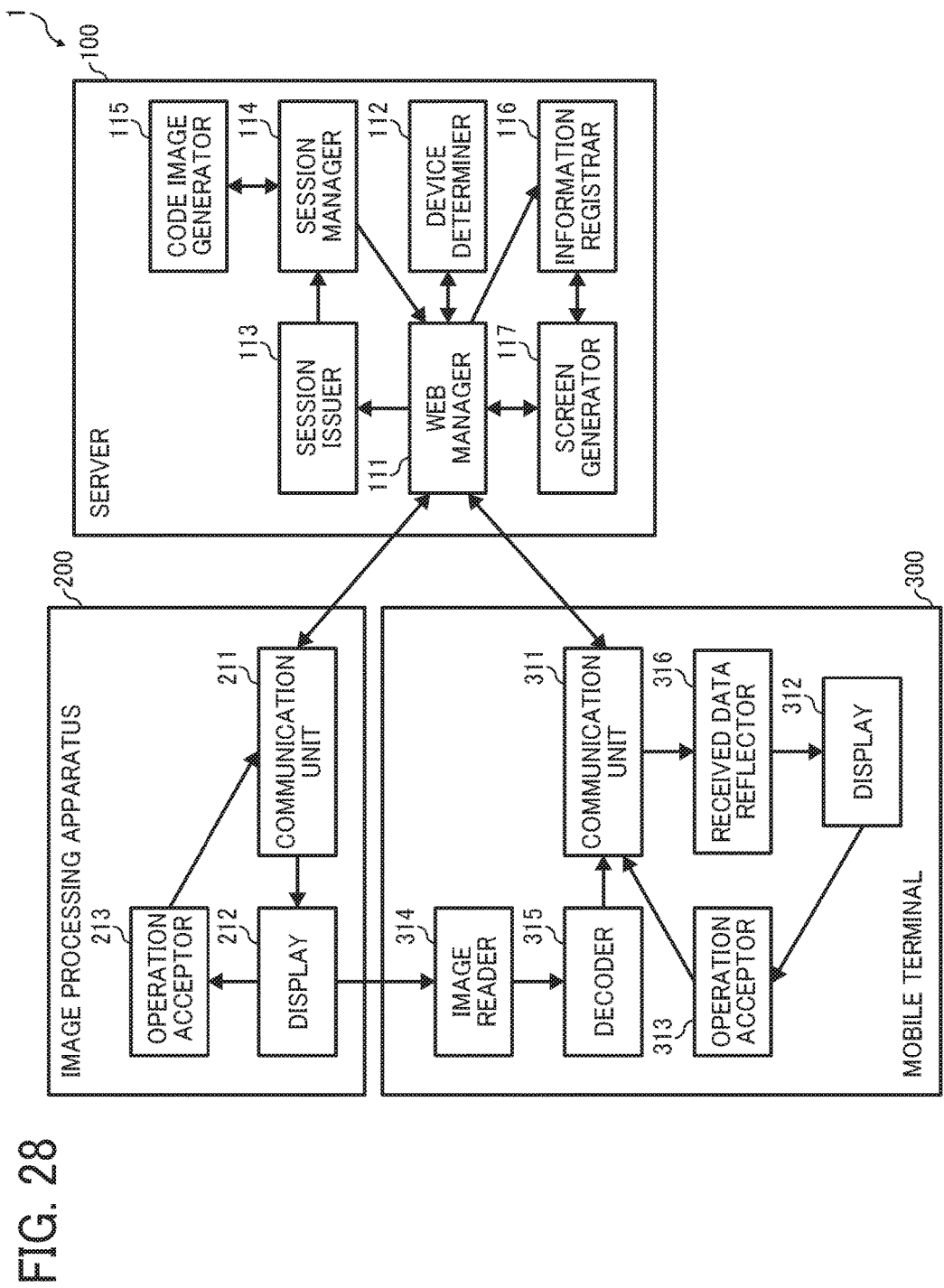
FIG. 28 is a schematic block diagram illustrating a functional configuration of the information processing system of FIG. 1, according to an embodiment of the present invention.
Figure 29:
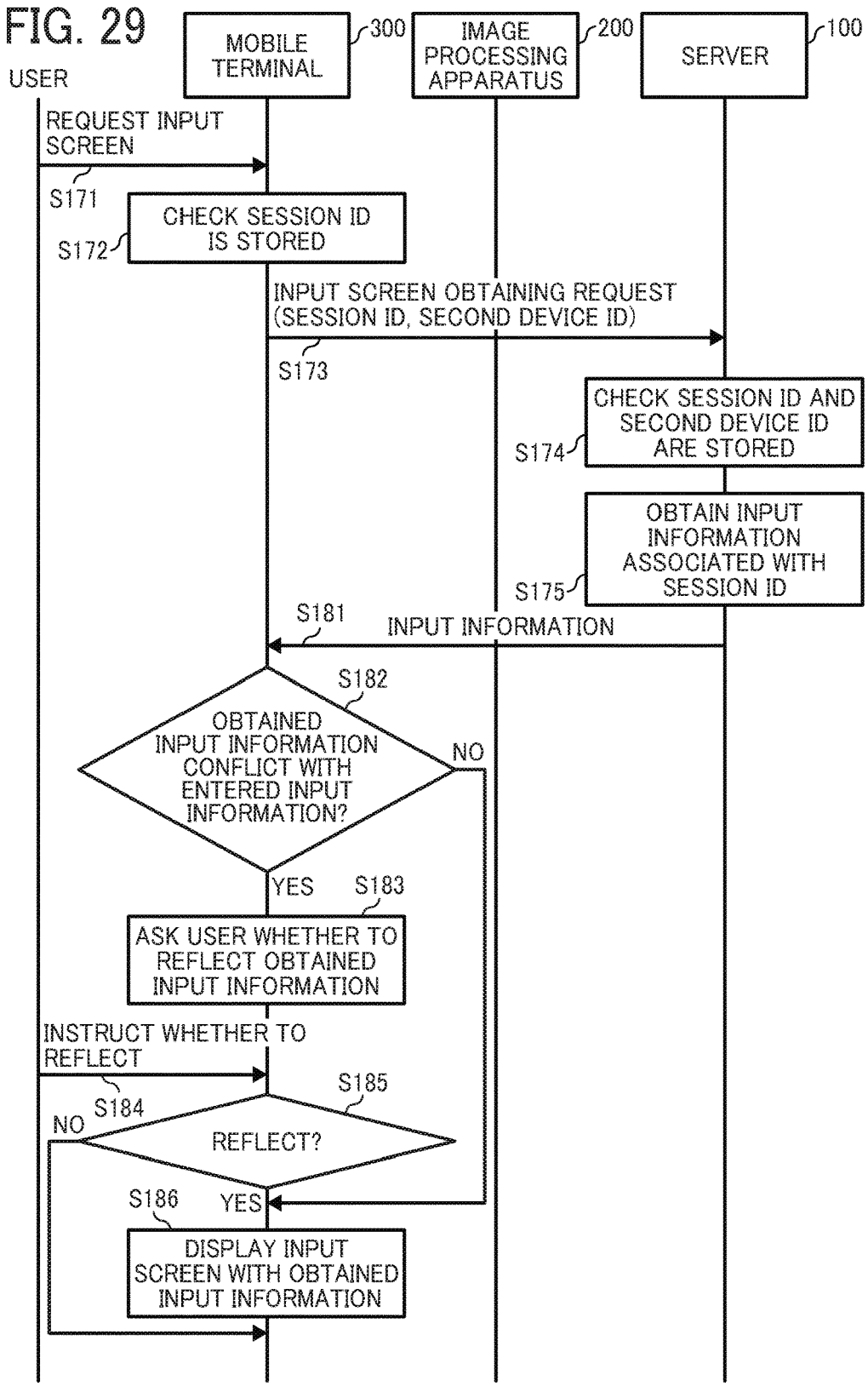
FIG. 29 is a data sequence diagram illustrating operation of processing a request for input information that is input by a user through the image processing apparatus, performed by the information processing system of FIG. 28, according to the embodiment of the present invention.
Figure 30:
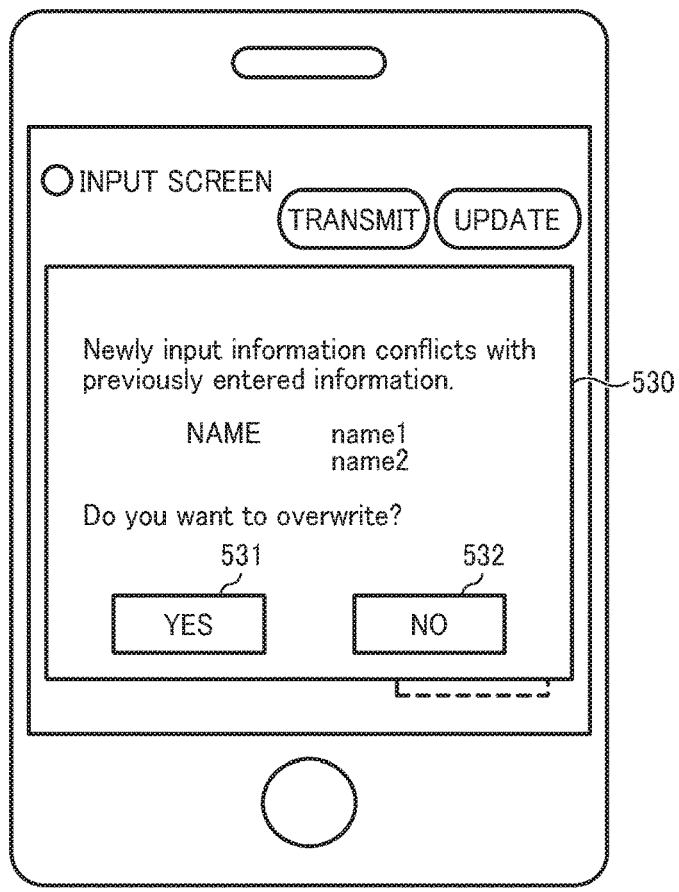
FIG. 30 is an illustration of a pop-up window displayed by the mobile terminal.

Referring to FIGS. 28 to 30, an information processing system is described according to an embodiment of the present invention. In this embodiment, in alternative to transmitting screen data including input information to the mobile terminal 300, the server 100 transmits the input information itself, which is input by the image processing apparatus 200, to the mobile terminal 300. The mobile terminal 300 reflects the received input information to an input screen for display.

FIG. 28 is a schematic block diagram illustrating a functional configuration of the information processing system 1 according to the embodiment of the present invention. The functional configuration of the image processing system 1 of FIG. 28 is substantially similar to that of the image processing system of FIG. 3, except that a part of the functions performed by the screen generator 117 is now performed by a received data reflector 316 of the mobile terminal 300. As illustrated in FIG. 28, the mobile terminal 300 includes the received data reflector 316, in addition to the units of the mobile terminal 300 of FIG. 3. The received data reflector 316 is implemented by the instructions of the CPU 301.

In using the information input assist service using the mobile terminal 300, the received data reflector 214 reflects input information, which is received by the communication unit 311 from the server 100, onto an input screen, while the input screen is being displayed by the display 312. The received data reflector 314 may further request the user to determine whether to reflect the input information to the input screen, before reflecting.

Further, in this embodiment, the screen generator 117 of the server 100 does not generate input screen data for the mobile terminal 300 having the input information that is received from the image processing apparatus 200.

More specifically, the mobile terminal 300 includes the received data reflector 316. In the information input assistance operation, the received data reflector 316 reflects input information, which is received from the server 100 at the communication unit 311, onto an input screen while the input screen is being displayed by the display 312. The received data reflector 316 may further request the user to determine whether to reflect the input information to the input screen, before reflecting.

Further, in this embodiment, the screen generator 117 of the server 100 does not generate input screen data for the mobile terminal 300 having the input information that is received from the image processing apparatus 200.

Referring to FIG. 29, operation of providing the information input assist service to the user operating the image processing apparatus 200, using the mobile terminal 300, is explained according to the embodiment of the present invention.

The steps of S171 to S175 of FIG. 29 is substantially similar to S171 to S175 of FIG. 27. At S181, the server 100 transmits the input information obtained at S175 as it is, to the mobile terminal 300 in response to the input screen obtaining request received at S173.

The mobile terminal 300, which receives the input information, performs S182 to S186, in a substantially similar manner as described above referring to S152 to S156 of FIG. 17.

More specifically, at S182, the mobile terminal 300 determines whether any part of the input information received from the server 100 conflicts with any part of input information that has been already input through the input screen being displayed on the display 312 of the mobile terminal 300. When it is determined that any item of information of the input information conflicts at S182 ("YES" at S182), at S183, the mobile terminal 300 asks the user whether to reflect the received input information onto the input screen. For example, the mobile terminal 300 may cause the display 312 to display a pop-up window 530 of FIG. 30.

The user then selects either "YES" or "NO" on the pop-up window of FIG. 30. In response to receiving a user instruction indicating whether to reflect at S184, at S185, the mobile terminal 300 selects whether to reflect the received input information. When the received input information is to be reflected ("YES" at S185), at S186, the mobile terminal 300 displays the input screen having the received input information reflected. When the received input information is not to be reflected ("NO" at S185), S186 is not performed, such that the input information that has been already entered is not updated.

Referring back to S182, when there is no conflict between the received input information and the registered input information, the mobile terminal 300 does not perform S183 to S185, and causes the display 312 to display the input screen having the received input information reflected at S186.

As described above, according to this embodiment of FIGS. 28 to 30, the mobile terminal 300 is able to confirm with the user whether to reflect the input information, which is input at the image processing apparatus 200, before reflecting such input information on the input screen of the mobile terminal 300, in case there has been input information already registered. With this configuration, any item of input information, which has been registered at the server 100, can be efficiently used.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

For example, the hardware and functional configuration of each apparatus, the steps being performed by each apparatus, a data structure of data to be processed by each apparatus, display content being displayed by each apparatus, are not limited to the above-described embodiments.

For example, the server 100 may allow the user to select whether or not to use the information input assist service in operating the image processing apparatus 200. For example, the administrator of the image processing apparatus 200 may configure such setting for the image processing apparatus 200. In such case, the image processing apparatus 200 may transmit a set value indicating whether the information input assist service is made valid as a query parameter to the server 100, together with the input screen obtaining request at S103 of FIG. 4.

Figure 31:
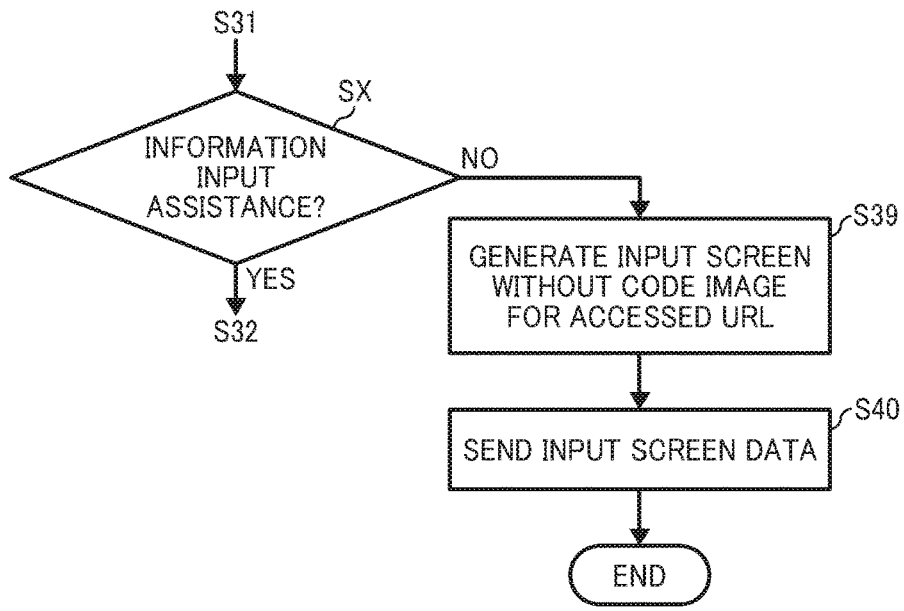
FIG. 31 is a flowchart illustrating modified steps of the flowchart of FIG. 14.

Further, in such embodiment, the server 100 may additionally perform the step SX of FIG. 31, between S31 and S32 of FIG. 14. At S31, the server 100 determines whether the image processing apparatus 200 is set to use the information input assist service. When the information input assist service is to be used, the operation proceeds to S32. When the information input assist service is not to be used, the operation proceeds to S39 and S40.

At S39, the CPU 101 of the server 100 generates input screen data for the image processing apparatus 200, without embedding the QR code. At S40, the server 100 transmits the input screen data to the image processing apparatus 200 that sends the request. Since the information input assist service is not used, the server 100 just provides screen data to the image processing apparatus 200, such that the server 100 does not issue or manage a session.

In any one of the above-described embodiments, the image processing apparatus 200 notifies the user at the mobile terminal 300 of information regarding the session ID and the URL to be accessed to the mobile terminal 300 in the form of code image being displayed. Alternatively, the image processing apparatus 200 may transmit such information to the mobile terminal 300 using any other communication method, such as using the near field wireless communication or pear-to-pear wireless communication. Alternatively, the image processing apparatus 200 may output such information in the form of character or voice for notification to the user.

In the above-described embodiments, the example case for using the MFP as the image processing apparatus 200 is used. Alternatively, any other apparatus not provided with image processing function may be used as the apparatus requesting for information input assistance service. For example, any desired apparatus provided with basic capability (such as an input device, an output device, and a communication interface) can be used as the apparatus to share a screen with the mobile terminal. Examples of such apparatus include, but not limited to, a projector, interactive whiteboard (IWB), videoconference system, digital camera, television, and recorder.

For example, the apparatus can access the server 100 according to a user instruction for input screen (S101 of FIG. 4), obtains web-content data of input screen encoded with a code image from the server 100, and displays the code image on a display. In case of the projector, the received screen data may be displayed on a screen, which could be any flat surface. In case of the IWB, videoconference system, or TV, the received screen data may be displayed on a display, which may be internally or externally provided. In case of the digital camera or recorder, the received screen data may be displayed on a touch panel functioning as input/output device.

In any of the cases, the mobile terminal 300 captures the code image being displayed, and sends a request for input screen to the server 300, which includes the session ID decoded from the code image and the second device ID identifying the mobile terminal 300 (S124 of FIG. 5). The mobile terminal 300 receives the web-based content data of input screen from the server 100, displays the input screen, and accepts a user input to the input screen. In a substantially similar manner as described above referring to S132 of FIG. 5, the input information can be registered to the server 100.

The server 100 does not have to know a type of request sender device sending the request for input screen, as long as the server 100 is able to distinguish between the first device and the second device. The first device corresponds to a device that the user desires to actually input information for registration using a user interface of the second device. The second device corresponds to a device that is operated by the user for information input to be registered to the first device. Accordingly, a plurality of types of apparatuses such as the projector and IWB may access the server 100 to each transmit a request for input screen to the same URL to share the input screen having the same content.

In any one of the above-described embodiments, the functions of the server 100 may be distributed over a plurality of servers on the network, which cooperatively operate as the server 100. Further, the functions of the server 100 may be partly performed by the image processing apparatus 200 or the mobile terminal 300.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

In case of implementing with a program, such program may be stored in a ROM or any other nonvolatile recording medium such as a flash memory or EEPROM of a programmable device, or any removable medium such as a memory card, CD, DVD, or blue-ray disc. Alternatively, such program may be downloaded from an external device such as a storage server storing such program, to be installed on the programmable device.

The invention claimed is:

1. A server apparatus for providing screen data to be shared among a plurality of information processing apparatuses, the server apparatus comprising:
   a receiver configured to receive data;
   a transmitter configured to transmit data; and
   processing circuitry configured to,
      receive, via the receiver, a first request from a first information processing apparatus through a network, the first request requesting first operation screen data, the first information processing apparatus being one of the plurality of information processing apparatuses, store, in a memory, a first communication identifier identifying a communication between the server apparatus and the first information processing apparatus, generate the first operation screen data associated with the first information processing apparatus such that the first operation screen data includes the first communication identifier, transmit, via the transmitter, the first operation screen data including the first communication identifier to the first information processing apparatus through the network, receive, via the receiver, a second request from a second information processing apparatus through the network, the second request requesting second operation screen data, the second information processing apparatus being a mobile terminal accessing the server apparatus, determine whether a second communication identifier extracted from the second request received from the second information processing apparatus matches the first communication identifier stored in the memory and included in the first operation screen data transmitted to the first information processing apparatus, generate the second operation screen data associated with the second information processing apparatus such that the second operation screen data is associated with the first operation screen data for the first information processing apparatus, in response to the first communication identifier included in the first operation screen data transmitted to the first information processing apparatus matching the second communication identifier received from the second information processing apparatus, and transmit, via the transmitter, the second operation screen data to the second information processing apparatus through the network, the second operation screen data being associated with display at the second information processing apparatus.

2. The server apparatus of claim 1, wherein the processing circuitry is further configured to, receive, via the receiver, second user input information from the second information processing apparatus that is input by a user through the second operation screen data displayed at the second information processing apparatus, and store the second user input information in the memory in association with the first communication identifier.

3. The server apparatus of claim 1, wherein the processing circuitry is configured to, receive, via the receiver, the first request from the first information processing apparatus such that the first request includes a first apparatus identifier identifying the first information processing apparatus that sends the first request, and store the first apparatus identifier in the memory in association with the first communication identifier.

4. The server apparatus of claim 3, wherein the processing circuitry is configured to, receive, via the receiver, the second request from the second information processing apparatus such that the second request includes a second apparatus identifier identifying the second information processing apparatus that sends the second request, determine whether the second apparatus identifier is stored in the memory in association with the first communication identifier, and transmit, to the second information processing apparatus via the transmitter, the second operation screen data for display at the second information processing apparatus, in response to the second apparatus identifier not being stored in the memory in association with the first communication identifier.

5. The server apparatus of claim 1, wherein the processing circuitry is configured to encode the first communication identifier into the first operation screen data as a code image.

6. The server apparatus of claim 1, wherein the processing circuitry is configured to generate the first operation screen data and the second operation screen data such that each are generated as HTML-based data.

7. The server apparatus of claim 1, wherein the first operation screen data and the second operation screen data are substantially same in data entry to which the user can input information.

8. The server apparatus of claim 1, wherein the server apparatus is configured to generate the first operation screen data such that the first operation screen data includes the first communication identifier embedded therein.

9. The server apparatus of claim 1, wherein the server apparatus is configured to generate the first operation screen data such that the first operation screen data includes a uniform resource locator (URL) associated with obtaining the second operation screen data from the server apparatus and a session ID identifying a session associated with the communication between the server apparatus and the first information processing apparatus.

10. The server apparatus of claim 2, wherein the server apparatus generates the first operation screen data information based on parameters associated with a display screen of the first information processing apparatus and generates the second operation screen data based on parameters associated with a display screen of the second information processing apparatus.

11. The server apparatus of claim 2, wherein the server is configured to provide an input information assist service by accepting input associated with the first information processing apparatus via the second user input information input by the user through the second operation screen data displayed at the second information processing apparatus.

12. A system, comprising:
at least a first information processing apparatus of a plurality of information processing apparatuses; and
a server connected to the plurality of information processing apparatuses through a network, the server configured to provide screen data to be shared among the plurality of information processing apparatuses, the server including one or more processors configured to,
receive a first request from the first information processing apparatus through the network, the first request requesting first operation screen data,
store, in a memory, a first communication identifier identifying a communication between the server and the first information processing apparatus,
generate the first operation screen data associated with the first information processing apparatus such that the first operation screen data includes the first communication identifier, transmit the first operation screen data including the first communication identifier to the first information processing apparatus through the network, receive a second request from a second information processing apparatus through the network, the second request requesting second operation screen data, the second information processing apparatus being a mobile terminal accessing the server, determine whether a second communication identifier extracted from the second request matches the first communication identifier stored in the memory and included in the first operation screen data transmitted to the first information processing apparatus, generate the second operation screen data associated with the second information processing apparatus such that the second operation screen data is associated with the first operation screen data for the first information processing apparatus, in response to the first communication identifier included in the first operation screen data transmitted to the first information processing apparatus matching the second communication identifier received from the second information processing apparatus, and transmit, second operation screen data to the second information processing apparatus through the network, the second operation screen data being associated with display at the second information processing apparatus.

13. The system of claim 12, wherein the one or more processors of the server is further configured to:

receive second user input information from the second information processing apparatus that is input by a user through the second operation screen data being displayed at the second information processing apparatus; and store the second user input information in the memory in association with the first communication identifier.

14. The system of claim 13, wherein the one or more processors of the server is further configured to:

receive a third request from the first information processing apparatus for obtaining operation screen data that reflects the second user input information from the first information processing apparatus;

generate updated first operation screen data that additionally includes the second user input information associated with the first communication identifier in the memory; and transmit the updated first operation screen data to the first information processing apparatus, wherein
the first information processing apparatus includes a display configured to display the updated first operation screen data received from the server in place of the first operation screen data.

15. The system of claim 12, wherein the server is a web content server capable of communicating with at least the first information processing apparatus installed with a web browser.

16. The system of claim 12, wherein the one or more processors of the server is further configured to, determine whether the first information processing apparatus that sends the first request is provided with a specific function, generate the first communication identifier in response to the first information processing apparatus having the specific function, receive the first request from the first information processing apparatus such that the first request includes a first apparatus identifier identifying the first information processing apparatus that sends the first request, store, in the memory, the first apparatus identifier in association with the first communication identifier, receive the second request from the second information processing apparatus such that the second request includes a second apparatus identifier identifying the second information processing apparatus that sends the second request, determine whether the second apparatus identifier is stored in the memory in association with the first communication identifier, and transmit, to the second information processing apparatus, the second operation screen data for display at the second information processing apparatus, in response to the second apparatus identifier not being stored in the memory in association with the first communication identifier.

17. A method for providing screen data to be shared among a plurality of information processing apparatuses, the method comprising:

receiving a first request from a first information processing apparatus through a network, the first request requesting first operation screen data, the first information processing apparatus being one of the plurality of information processing apparatuses;

storing, in a memory, a first communication identifier identifying a communication with the first information processing apparatus;

generating the first operation screen data associated with the first information processing apparatus such that the first operation screen data includes the first communication identifier;

transmitting the first operation screen data including the first communication identifier to the first information processing apparatus through the network;

receiving a second request from a second information processing apparatus through the network, the second request requesting second operation screen data, the second information processing apparatus being a mobile terminal;

determining whether a second communication identifier extracted from the second request received from the second information processing apparatus matches the first communication identifier stored in the memory and included in the first operation screen data transmitted to the first information processing apparatus;

generating the second operation screen data associated with the second information processing apparatus such that the second operation screen data is associated with the first operation screen data for the first information processing apparatus, in response to the first communication identifier included in the first operation screen data transmitted to the first information processing apparatus matching the second communication identifier received from the second information processing apparatus; and transmitting second operation screen data to the second information processing apparatus through the network, the second operation screen data being associated with display at the second information processing apparatus.

18. The method of claim 17, further comprising:

receiving second user input information from the second information processing apparatus that is input by a user through the second operation screen data displayed at the second information processing apparatus; and storing the second user input information in the memory in association with the first communication identifier.

19. The method of claim 18, further comprising:

receiving a third request from the first information processing apparatus for obtaining operation screen data that reflects the second user input information from the first information processing apparatus;

generating updated first operation screen data that additionally includes the second user input information associated with the first communication identifier in the memory; and transmitting the updated first operation screen data to the first information processing apparatus for display at the first information processing apparatus in place of the first operation screen data currently displayed.

20. The method of claim 17, further comprising:

determining whether the first information processing apparatus that sends the first request is provided with a specific function;

generating the first communication identifier in response to the first information processing apparatus having the specific function;

receiving the first request from the first information processing apparatus such that the first request includes a first apparatus identifier identifying the first information processing apparatus that sends the first request;

storing, in the memory, the first apparatus identifier in association with the first communication identifier;

receiving the second request from the second information processing apparatus such that the second request includes a second apparatus identifier identifying the second information processing apparatus that sends the second request;

determining whether the second apparatus identifier is stored in the memory in association with the first communication identifier; and transmitting, to the second information processing apparatus, the second operation screen data for display at the second information processing apparatus, in response to the second apparatus identifier not being stored in the memory in association with the first communication identifier.

* * * * *